(12) United States Patent
Ueda et al.

(10) Patent No.: US 8,423,052 B2
(45) Date of Patent: Apr. 16, 2013

(54) COMMUNICATION DEVICE, INFORMATION PRESENTATION DEVICE, COMMUNICATION METHOD, PROGRAM, AND RECORDING MEDIUM

(75) Inventors: Toru Ueda, Osaka (JP); Junichi Shirakawa, Osaka (JP); Syuji Daioku, Osaka (JP); Nobuo Kusumoto, Osaka (JP); Akira Tojima, Osaka (JP); Takehiko Shioda, Kawasaki (JP); Akihiro Tozaki, Kawasaki (JP); Kunihiro Minoshima, Kawasaki (JP); Kazunori Hashimoto, Kawasaki (JP)

(73) Assignees: Sharp Kabushiki Kaisha, Osaka (JP); Pioneer Corporation, Kanagawa (JP)

( * ) Notice: Subject to any disclaimer, the term of this patent is extended or adjusted under 35 U.S.C. 154(b) by 233 days.

(21) Appl. No.: 13/119,118

(22) PCT Filed: Sep. 2, 2009

(86) PCT No.: PCT/JP2009/065362
§ 371 (c)(1),
(2), (4) Date: Apr. 12, 2011

(87) PCT Pub. No.: WO2010/032618
PCT Pub. Date: Mar. 25, 2010

(65) Prior Publication Data
US 2011/0183627 A1 Jul. 28, 2011

(30) Foreign Application Priority Data
Sep. 17, 2008 (JP) .................. 2008-238492

(51) Int. Cl.
*H04W 24/00* (2009.01)
(52) U.S. Cl.
USPC ........................ 455/457; 455/456.1
(58) Field of Classification Search .............. 455/456.3, 455/456.1, 457, 404.2, 456.2, 456.5, 456.6
See application file for complete search history.

(56) References Cited

U.S. PATENT DOCUMENTS

| 7,085,578 B2 * | 8/2006 | Barclay et al. ............ 455/457 |
| 2002/0065606 A1 | 5/2002 | Kawai et al. |

(Continued)

FOREIGN PATENT DOCUMENTS

| CN | 101150856 A | 3/2008 |
| JP | 11-283194 A | 10/1999 |

(Continued)

OTHER PUBLICATIONS

International Search Report, dated Oct. 13, 2009, issued in corresponding International Application PCT/JP2009/065362.

*Primary Examiner* — Lewis West
(74) *Attorney, Agent, or Firm* — Birch, Stewart, Kolasch & Birch, LLP

(57) ABSTRACT

It is possible to present identification information of a sender in such a manner that the identification information is easily understood by a user. Included are: a wireless communication section (20) for carrying out data communication with the navigation device (50); and a line communication section (30) for carrying out data communication with the communication device (80), and an address sending section (22) for sending, to the navigation device (50) via the wireless communication section (20), first identification information for identifying the communication device (80); a position receiving section (26) for receiving position information from the communication device (80) via the line communication section (30); a position sending section (24) for sending the position information to the navigation device (50) via the wireless communication section (20); a message receiving section (32) for receiving a message from the navigation device (50) via the wireless communication section (20); an address adding section (34) for adding, to the message, second identification information for identifying the communication device (10); and a message sending section (36) for sending, to the communication device (80) via the line communication section (30), the message to which the second identification information is added.

7 Claims, 15 Drawing Sheets

U.S. PATENT DOCUMENTS

| | | | |
|---|---|---|---|
| 2003/0016804 A1* | 1/2003 | Sheha et al. | 379/201.06 |
| 2003/0060976 A1 | 3/2003 | Sato et al. | |
| 2003/0069683 A1* | 4/2003 | Lapidot et al. | 701/117 |

FOREIGN PATENT DOCUMENTS

| | | |
|---|---|---|
| JP | 2003-106854 A | 4/2003 |
| JP | 2004-130894 A | 4/2004 |
| JP | 2004-212339 A | 7/2004 |
| JP | 2005-3592 A | 1/2005 |
| JP | 2005-127949 A | 5/2005 |
| JP | 2007-71665 A | 3/2007 |
| JP | 2007-78507 A | 3/2007 |
| JP | 2007-205872 A | 8/2007 |
| JP | 2007-256118 A | 10/2007 |
| JP | 2008-27011 A | 2/2008 |

* cited by examiner

Select recipient

Mother      mama@???.ne.jp
Daughter    musume @???.ne.jp
Mr. Suzuki  suzuki@??.co.jp (b)

Confirm recipient

Do you want to send a
notification email to
Daughter   musume@???.ne.jp?

[ OK ]    [ Cancel ]

(c)

Sender  akira@xxxxx.ne.jp
Title   Pickup notification
        email

This is a pickup notification
email from X.
X will arrive at Tsudayama at
19:32.
Current position of X is
Narashino-shi Yamada.

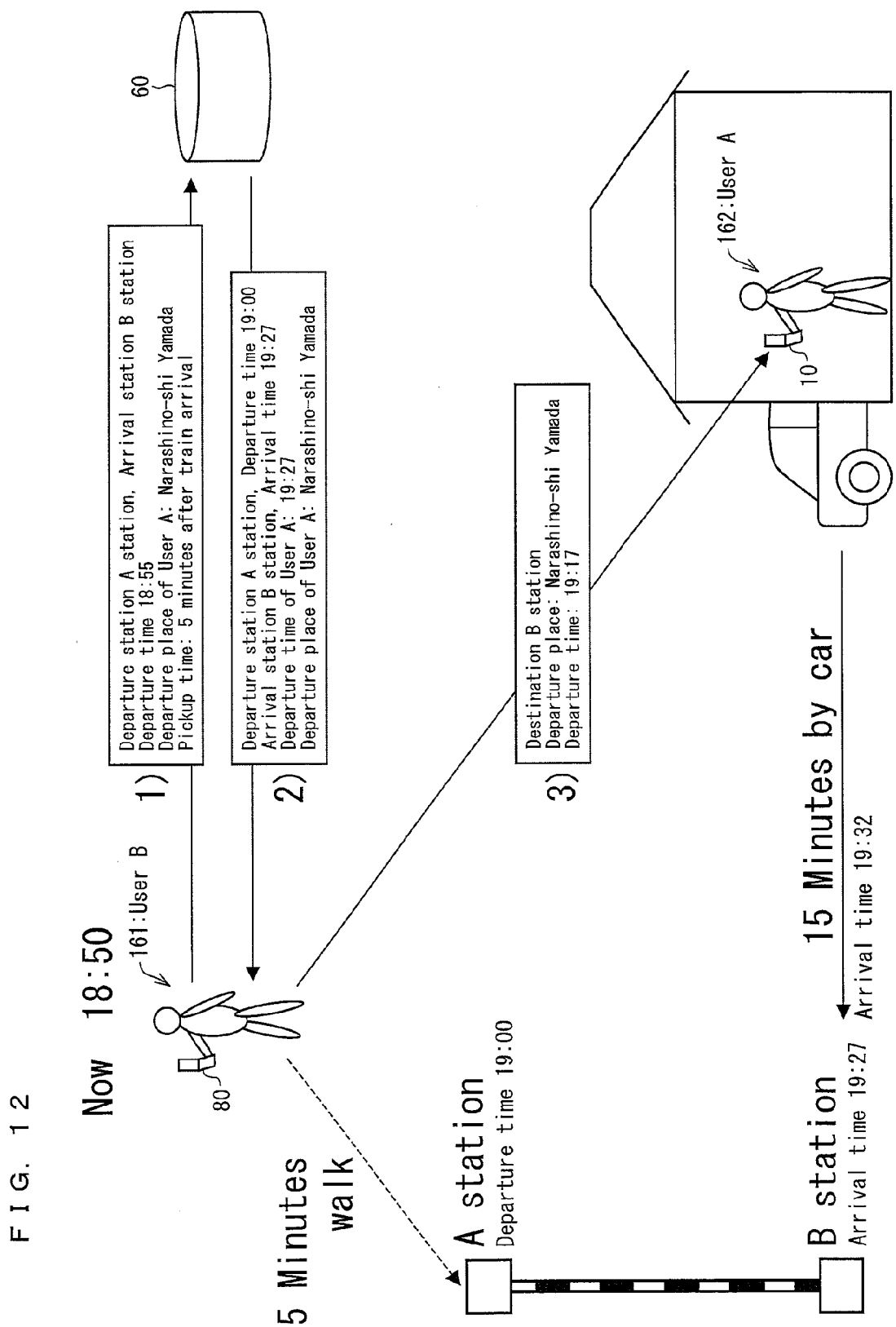

Pickup setting

Departure time : 8 / 1  18:55

Departure station : Tokyo    Arrival station : Tsudayama

Departure place of pickup person : Narashino-shi Yamada

Pickup  0 minutes after train arrival
        5
        10

Pickup request (b)

Please come to Tsudayama at 19:32.
In a case of departure at
Narashino-shi Yamada,
departure time is 19:17.

--------------------------

Send (c)

Please come to Tsudayama at 19:32.
In a case of departure at
Narashino-shi Yamada,
departure time is 19:17.

--------------------------

COMMUNICATION DEVICE, INFORMATION PRESENTATION DEVICE, COMMUNICATION METHOD, PROGRAM, AND RECORDING MEDIUM

TECHNICAL FIELD

The present invention relates to a communication device that receives data and transfers the data to another device.

BACKGROUND ART

Conventionally, there has been known a system in which (i) a current position of a first communication device of a user away from home is sent to a second communication device of a user at home, (ii) the received current position is further sent to a navigation device, and then (iii) the current position of the user away from home is set as a destination of the navigation device (for example, refer to Patent Literature 1).

Further, there has been a navigation device for (i) estimating an arrival time at a set destination and (ii) sending the estimated arrival time to a first communication device (for example, refer to Patent Literature 2).

According to the foregoing conventional configurations, the user of the second communication device can easily cause the navigation device to carry out route guidance to the current position of the first communication device. Further, the user of the first communication device can recognize, from a notification from the navigation device, an approximate time at which the user of the first communication device meets the user of the second communication device.

CITATION LIST

Patent Literatures
Patent Literature 1
Japanese Patent Application Publication, Tokukai, No. 2003-106854 A (Publication Date: Apr. 9, 2003)
Patent Literature 2
Japanese Patent Application Publication, Tokukai, No. 2005-127949 A (Publication Date: May 19, 2005)

SUMMARY OF INVENTION

Technical Problem

However, with the foregoing conventional configurations, the following problem arises. That is, since the estimated arrival time is sent from the navigation device to the first communication device, the user of the first communication device cannot recognize who is about to come.

Specifically, the user of the first communication device, which has received the estimated arrival time, recognizes a source of the estimated arrive time; however, the source is the navigation device. Therefore, although the user of the first communication device recognizes that the navigation device is on the way to the current position of the user of the first communication device, the user of the first communication device cannot recognize who is on the way, with use of the navigation device, to the current position of the user of the first communication device.

The present invention has been made in view of the above problem, and an object of the present invention is to achieve a communication device etc. each of which makes it possible, in a case where (i) the communication device, which has received data from another communication device, sends the data to a further device (e.g., a navigation device), and (ii) the communication device transfers a message (e.g., estimated arrive time) from the further device to the another communication device, to present the message in a way that the message is easily understood by a user of the another communication device.

Solution to Problem

In order to attain the above object, a communication device in accordance with the present invention includes: first communication means for carrying out data communication with an information presentation device; and second communication means for carrying out data communication with another communication device, said communication device, further including: identification information sending means for sending, to the information presentation device via the first communication means, first identification information for identifying the another communication device; position information receiving means for receiving, from the another communication device via the second communication means, position information for specifying a position; position information sending means for sending the position information to the information presentation device via the first communication means; message receiving means for receiving a message from the information presentation device via the first communication means; identification information adding means for adding, to the message, second identification information for identifying the communication device; and message sending means for sending, to the another communication device via the second communication means, the message to which the second identification information is added by the identification information adding means.

A communication method in accordance with the present invention is a communication method carried out by a communication device including: first communication means for carrying out data communication with an information presentation device; and second communication means for carrying out data communication with another communication device, said method, including the steps of: sending, to the information presentation device via the first communication means, first identification information for identifying the another communication device; receiving, from the another communication device via the second communication means, position information for specifying a position; sending the position information to the information presentation device via the first communication means; receiving a message from the information presentation device via the first communication means; adding, to the message, second identification information for identifying the communication device; and sending, to the another communication device via the second communication means, the message to which the second identification information is added in the step of adding.

According to the configuration, the identification information sending means sends, to the information presentation device, the first identification information for identifying the another communication device. As a specific example, the identification information sending means sends, to the information presentation device such as a navigation device, an email address stored in an address book of the communication device. This makes it possible to create, on the navigation device, a message directed to the email address stored in the address book.

Further, the position information receiving means receives, from the another communication device, the position information for specifying the position. Then, the position information sending means sends the position information to the information presentation device. This enables the information presentation device to carry out operations, such as destination setting, on the basis of the position information specified by a user of the another communication device.

Furthermore, the message receiving means receives the message from the information presentation device; the identification information adding means adds, to the message, the second identification information for identifying the communication device; and the message sending means sends, to the another communication device, the message to which the second identification information of the communication device is added. This makes it possible to achieve an effect that the another communication device, which receives the message, identifies the communication device as a sender of the message.

As described so far, the communication device sends, to the information presentation device, the first identification information stored in the communication device. Then, the communication device adds, to the message, the second identification information of the communication device, and then sends the message. This makes it possible to achieve a communication device that allows for presentation of identification information of a sender in such a way that the identification information is easily recognized by a user.

The communication device in accordance with the present invention is preferably configured such that: the position information received by the position information receiving means is image data in which the position information is embedded.

According to the configuration, the position information is embedded in the image data. Accordingly, for example in a case where the image data is a photograph of facilities around a place indicated by the position information, a user who sees the image data on the communication device can visually recognize the place indicated by the position information. Further, since the position information is sent as the image data, it is possible to achieve a further effect that the position information can be sent by making use of a configuration in which the image data is sent and received.

The communication device in accordance with the present invention is preferably configured such that: the first communication means is communication means for establishing communication via a short-distance wireless communication; and the second communication means is communication means for establishing communication via a mobile telephone network.

According to the configuration, the communication device communicates with the another communication device via the mobile telephone network, and communicates with the information presentation device via the short-distance wireless communication. This achieves a further effect that appropriate communication is achieved at a speed and by a method depending on the device with which the communication device communicates. For a specific example, in a case where the another communication device is a mobile terminal or the like, a communication method hardly affected by the position of the recipient, such method as 3G, can be used as the mobile telephone network. In a case where the information presentation device is a navigation device or the like located near the communication device, a cost-free and high-speed communication method such as Bluetooth® can be used as the short-distance wireless communication.

Further, it is possible to achieve an information presentation device for communicating with the foregoing communication device by an information presentation device for communicating with the foregoing communication device via the first communication means, including: identification information receiving means for receiving, via the first communication means, the first identification information for identifying the another communication device; recipient selecting means for presenting, in accordance with the first identification information, a message recipient in a selectable manner; position information receiving means for receiving the position information from the communication device via the first communication means; arrival time estimating means for estimating, on the basis of the position information, an arrival time at which the information presentation device arrives at the position specified by the position information; message generating means for generating, on the basis of the arrival time estimated by the arrival time estimating means, a message to be sent to the message recipient selected via the recipient selecting means; and message sending means for sending, to the communication device via the first communication means, the message generated by the message generating means.

Each of the aforementioned communication device and the information presentation device can be realized by a computer. In that case, the present invention encompasses also: a program for causing a computer to realize each of the aforementioned communication device and the information presentation device by causing the computer to function as the foregoing means; and a computer-readable recording medium in which the program is stored.

Advantageous Effects of Invention

A communication device in accordance with the present invention includes: first communication means for carrying out data communication with an information presentation device; and second communication means for carrying out data communication with another communication device, said communication device, further including: identification information sending means for sending, to the information presentation device via the first communication means, first identification information for identifying the another communication device; position information receiving means for receiving, from the another communication device via the second communication means, position information for specifying a position; position information sending means for sending the position information to the information presentation device via the first communication means; message receiving means for receiving a message from the information presentation device via the first communication means; identification information adding means for adding, to the message, second identification information for identifying the communication device; and message sending means for sending, to the another communication device via the second communication means, the message to which the second identification information is added by the identification information adding means.

A communication method in accordance with the present invention is a communication method carried out by a communication device including: first communication means for carrying out data communication with an information presentation device; and second communication means for carrying out data communication with another communication device, said method, including the steps of: sending, to the information presentation device via the first communication means, first identification information for identifying the another communication device; receiving, from the another communication device via the second communication means, position information for specifying a position; sending the position information to the information presentation device via the first communication means; receiving a message from the information presentation device via the first communication means; adding, to the message, second identification information for identifying the communication device; and sending, to the another communication device via the second communication means, the message to which the second identification information is added in the step of adding.

According to the configuration, the communication device sends, to the information presentation device, the first identification information stored in the communication device. Then, the communication device adds, to the message, the second identification information of the communication device, and then sends the message. This achieves an effect that identification information of a sender can be presented in such a way that the identification information is easily recognized by a user.

For a fuller understanding of the nature and advantages of the invention, reference should be made to the ensuing detailed description taken in conjunction with the accompanying drawings.

BRIEF DESCRIPTION OF DRAWINGS

FIG. 11 (a) through (c) of FIG. 11 illustrate examples of screens displayed when a pickup notification email is sent and received.

FIG. 12 is a conceptual view schematically illustrating what movements are carried out before the communication device and the navigation device arrive at a destination.

FIG. 13 (a) through (c) of FIG. 13 illustrate an operation screen and email viewing screens displayed on communication terminals.

DESCRIPTION OF EMBODIMENTS

The following description discusses one embodiment of the present invention with reference to FIGS. 1 through 15.

Figure 1:
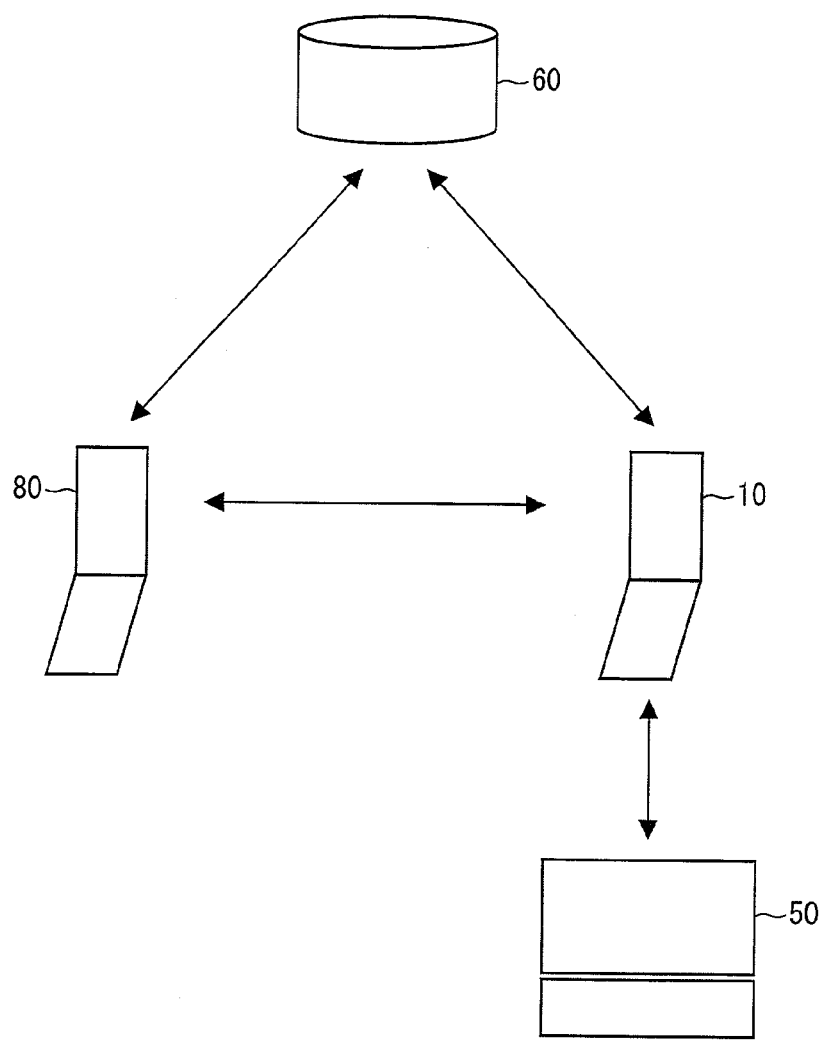
FIG. 1, showing one embodiment of the present invention, is a conceptual view illustrating how a chief part of a communication system is configured.

FIG. 1 is a view schematically illustrating how a communication system of the present embodiment is configured. The communication system of the present embodiment includes: a communication device 10; a navigation device 50 (information presentation device); an external server 60; and a communication device 80.

The communication device 10 and the communication device 80 can communicate with each other via a mobile telephone network such as 3G. Further, each of the communication device 10 and the communication device 80 is capable of communicating with the external server 60 so as to use an information service that provides information such as map information or train transfer information. The communication device 10 belongs to a user A, and the communication device 80 belongs to a user B. The navigation device 50 is installed in a vehicle that belongs to the user A, and is capable of communicating with the communication device 10 via Bluetooth®.

The user B is asking the user A to come to pick up the user B, by sending an email from the communication device 80 via the mobile telephone network. The email sent by the user B has an image attached thereto, in which image at least position information (latitude and longitude information) of a destination is embedded. The position information is obtained from a service running on the external server 60. Note here that, in the image, data including an arrival time at the destination can be embedded in addition to the position information. The following description discusses how data are exchanged in a case where the user A, who has received on the communication device 10 the email from the user B, is going to pick up the user B by the vehicle in which the navigation device 50 is installed.

Figure 2:
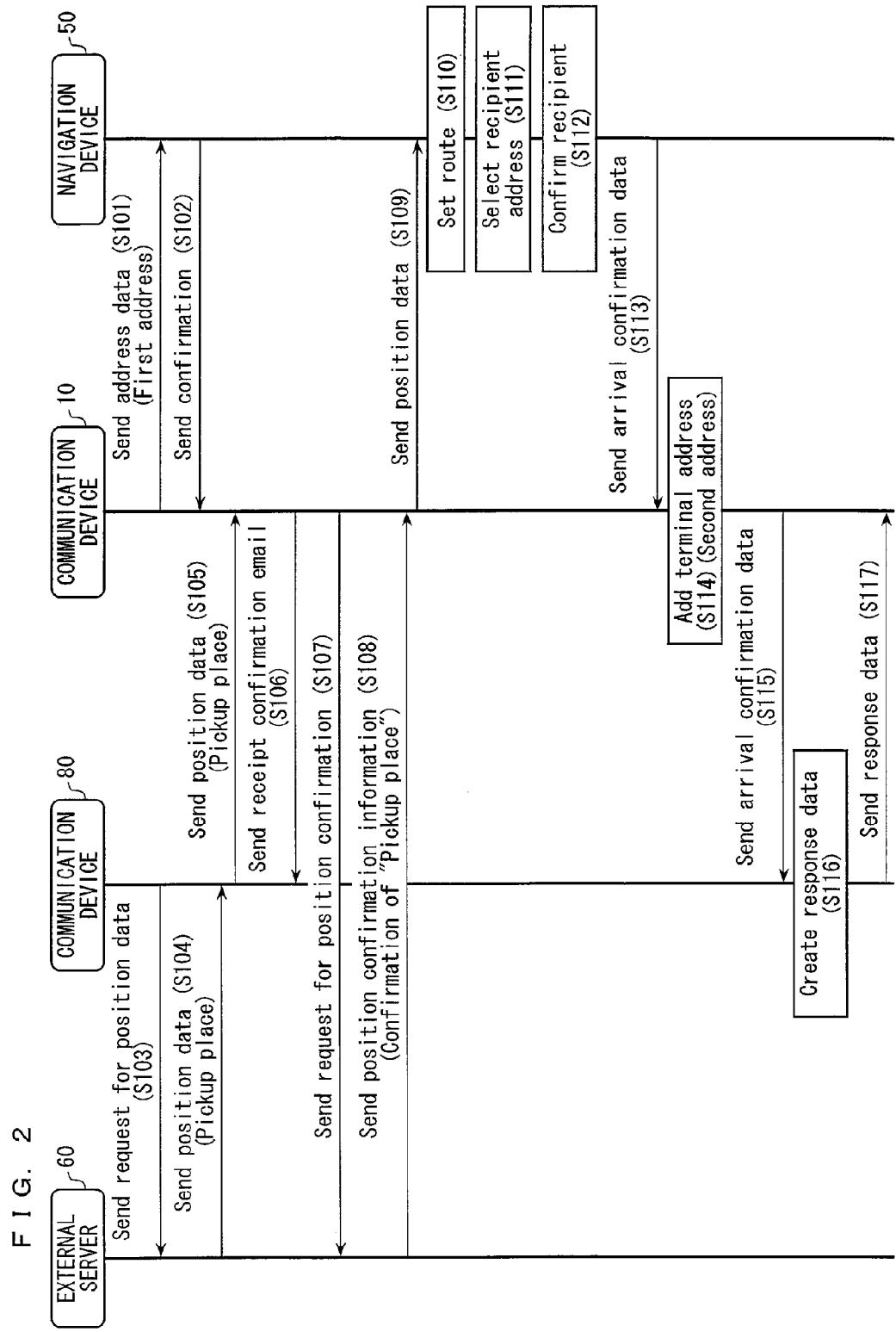
FIG. 2 is a sequence diagram illustrating how data are exchanged in the communication system.

FIG. 2 is a sequence diagram illustrating how the data are exchanged in the communication system of the present embodiment. As described earlier, the communication device 10 belongs to the use A, the navigation device 50 is installed in the vehicle belonging to the user A, and the communication device 80 belongs to the user B. Further, the external server 60 is in another place away from the user A and the user B.

The following description is based on the assumption that the user A is about to go to pick up the user B by the vehicle in which the navigation device 50 is installed. The user B is traveling by train, and asking the user A to come to a station at which the user B gets off.

First, in step S101, the communication device 10 sends, to the navigation device 50, address data (first address) stored in an address book. The address data includes an email address of the communication device 80 that belongs to the user B.

In a case where the address book of the communication device 10 includes also address data other than the email address of the communication device 80, such address data can also be sent to the navigation device 50. Note, however, that the address book of the communication device 10 may include address data that does not have to be sent to the navigation device 50. Therefore, the user A preferably makes settings on the communication device 10 in advance so that intended address data only is sent to the navigation device 50.

The navigation device 50 displays, as candidates for a recipient of a message, the address data supplied from the communication device 10 (this is described later in detail). Then, the navigation device 50 sends the message to an address selected from those displayed as the candidates.

Next, in step S102, the navigation device 50 sends, to the communication device 10, a confirmation indicating that the navigation device 50 has received the address data (first address).

According to the present embodiment, the address data is information for identifying an individual, such information as a name, an email address, a telephone number, or the like stored in the address book of the communication device 10. Note, however, that the address data is not limited to those described above. Alternatively, the address data can be: information for identifying a device on the network, such as an MAC address, an IP address, or the like; or biometric data for identifying an individual, such as a fingerprint or a voiceprint.

Next, in step S103, the user B carries out searches on the communication device 80 that belongs to the user B for information on a place and a time at which the user B wants the user A to come. Specifically, the user B requests the external server 60, via the communication device 80, to provide (i) position data indicating a position (i.e., "pickup place") of the station at which the user B gets off and (ii) a time at which the train arrives at the station.

In step S104, the communication device 80 receives, from the external server 60 which has received the request from the communication device 80, the time at which the train arrives at and the position data of the station at which the user B gets off. The time and the position data are obtained as image data in which the time and the position data are embedded.

Note in the present embodiment that, although the position data of the station at which the user B gets off is obtained by sending the request to the external server 60, the method of obtaining the position data is not limited to this. For example, in a case where the user B is already in the "pickup place" where the user B wants the user A to come, the position data can be obtained such that (i) the communication device 80 includes a GPS (Global Positioning System) and (ii) a current position obtained by the communication device 80 is sent to the communication device 10 of the user A. Alternatively, the communication device 80 can be configured such that: it includes a database and a search software so as to obtain position information of the "pickup place", such as the station at which the user B gets off, to which the user B wants the user A to come.

In step 105, the communication device 80 sends, to the communication device 10, the image data obtained from the external server 60. The image data is sent as "pickup place" information. The "pickup place" information can include, in addition to the position data of the station at which the user B gets off and the time at which the train arrives at the station, position information indicating a current position of the communication device 80.

Hereinafter, an email sent from the communication device 80 to the communication device 10, which email includes the "pickup place" information, is referred to as a pickup email. The data communication between the communication device 80 and the communication device 10 can be carried out in any way. In the present embodiment, the data communication is carried out by making use of an email function of each of the communication device 80 and the communication device 10.

Next in step S106, the communication device 10, which has received the "pickup place" information, sends a receipt confirmation email to the communication device 80. The receipt confirmation email indicates that the communication device 10 has received the "pickup place" information.

Next in step S107, the communication device 10 sends, to the external server 60, the "pickup place" information (i.e., the image data in which the position data of the "pickup place" etc. are embedded) included in the pickup email received in step S105, so as to request the external server 60 to confirm a position of the "pickup place".

The external server 60, which has received the "pickup place" information and the request for confirming the position of the "pickup place", searches for information relevant to a position (i.e., the "pickup place") indicated by the position data included in the received "pickup place" information. Then, the external server 60 sends the detected information to the communication device 10 as position confirmation information. The communication device 10 displays, after receipt of the position confirmation information from the external server 60, the received position confirmation information automatically or in response to an input operation by the user A.

The position confirmation information is not limited to a particular kind, as long as the position confirmation information helps the user A to arrive at the "pickup place". For example, the position confirmation information can be (i) a map, of an area around the "pickup place", on which facilities such as a restaurant around the "pickup place" are illustrated, (ii) information indicating facilities around the "pickup place", (iii) traffic-jam information or whether information around the "pickup place", or (iv) a combination of any of (i) through (iii).

The communication device 10 preferably carries out the processes of S107 and S108, because, as described above, the communication device 10 is possible to obtain, by forwarding the "pickup place" information to the external server 60, the position confirmation information that helps the user A to arrive at the "pickup place". However, the processes of S107 and S108 can be omitted, because these processes are not essential to the present invention.

In step S109, the communication device 10 sends, to the navigation device 50, the "pickup place" information (i.e., the image data in which the position data of the "pickup place" etc. are embedded) obtained in step S105. Note here that the "pickup place" information is sent from the communication device 10 to the navigation device 50 via Bluetooth.

Next in step S110, the navigation device 50 searches for, on the basis of the "pickup place" information received in step S109, a route from the current position to the "pickup place" and sets the route. Meanwhile, the navigation device 50 estimates an arrival time at the "pickup place".

In step S111, the navigation device 50 displays the address data (first address) received in step S101, so as to cause the user A to select a recipient of arrival confirmation data. The arrival confirmation data indicates that (i) the user A is on the way to the "pickup place", (ii) the estimated arrival time at which the user A arrives at the "pickup place", and (iii) the like. The arrival confirmation data can include a message from the user A, such message as "I'm leaving at xx-o'clock so as to arrive at the xxx station at xxxx o'clock".

The arrival confirmation data can be sent to any address included in the address data, and can be sent concurrently to a plurality of addresses. In the present embodiment, the communication device 80 is selected to be the recipient of the arrival confirmation data.

After the recipient is selected, the navigation device 50 in step S112 requests the user A to confirm the recipient. After the recipient is confirmed in step S112, the navigation device 50 sends in step S113 the arrival confirmation data to the communication device 10.

In step S114, the communication device 10 adds, to the arrival confirmation data received in step S113, an address (second address) for identifying the communication device 10. The second address for identifying the communication device 10 is added to the arrival confirmation data for the following reason. That is, in a case where a message such as an email is sent directly from the navigation device 50, the communication device 10 serves only as a communication device (modem). In such a case, identification information of the navigation device 50 only is recorded as a sender of the message. In view of this, the second address is added to the arrival confirmation data in order to avoid a situation where it is difficult for the user B to recognize who sent the message.

Setting the identification information (in this case, an email address or a telephone number) of the communication device 10 as the sender (From) enables the user B to recognize that the message is sent from the communication device 10 which belongs to the user A. Further, the user B can send, by replying to the received message, a message not to the navigation device 50 but to the communication device 10. As described so far, according to this configuration, the user B easily identifies the sender and thus can easily reply to the message from the user A.

The above configuration is advantageous also for the user A, because the user A does not have to input the address on the navigation device 50 and to make settings so that a recipient recognizes that the user A is using the communication device 10. That is, the above configuration makes it possible to simplify the operation in which the user A replies to the email requesting the user A to come to pick up the user B.

Thereafter, in step S115, the communication device 10 sends, to the communication device 80, the arrival confirmation data to which the second address is added in step S114. Note here that the following description discusses one example in which the arrival confirmation data is sent, immediately after the route is set, in response to the user operation of selecting a recipient address. However, the arrival confirmation data can be sent anytime after the route is set but before the user A arrives at the destination.

Then, in step S116, the communication device 80 creates response data to the arrival confirmation data received in step S115. The response data is for example a reply email such as an email including a message "OK, take care". In step S117, the communication device 80 sends the response data to the communication device 10. This finishes a series of processes.

Note here that, according to an example illustrated in FIG. 2, the communication device 10 carries out the processes of S101 and S102, i.e., sends the address data to the navigation device, before receiving the position data. However, the timings at which the processes of S101 and S102 are carried out are not limited to those described in FIG. 2, as long as these processes are carried out before the recipient address is selected in step S111.

Further, according to the example illustrated in FIG. 2, the communication device 80 receives in step S104 the position data created by the external server 60, and then the communication device 80 forwards in step S105 the pickup email including the position data to the communication device 10. Note, however, that it is possible to employ an alternative configuration in which the external server 60 creates and sends the pickup email directly to the communication device 10.

Further, in step S105 of FIG. 2, the communication device 10 can store, upon receipt of the position data, the email address of the communication device 80 which is the sender of the position data. This makes it possible to send the arrival confirmation data to the communication device 10 with use of the email address recorded in step S105, even if (i) step S111 in which the recipient address is selected on the navigation device 50 and (ii) step S112 in which the recipient is confirmed on the navigation device 50 are omitted and therefore the recipient is empty in step S113. That is, immediately after or before the terminal address is added in step S114, the communication device 10 can set the stored email address as the recipient (To:), and then send in step S115 the arrival confirmation data to the communication device 80.

Similarly, the communication device 80 can, after receipt of the position data in step S104, (i) further embed the email address of the communication device 80 into the image in which the position data is embedded and then (ii) send in step S105 the position data to the communication device 10. This makes it possible to send in step S113 the arrival confirmation data to the communication device 10 by setting the email address included in the position data (image) as the recipient (To:), even if (a) step S111 in which the recipient address is selected on the navigation device 50 and (b) step S112 in which the recipient is confirmed on the navigation device 50 are omitted.

Through the foregoing series of processes, the user B informs the user A of where and when the user B wants the user A to come. The user A (i) recognizes a time and a place at which the user B arrives, (ii) calculates a route to a pickup place and an estimated arrival time, and (iii) sends a message which confirms that the user A has received the message stating that the user B wants the user A to come. Since the message sent to the user B includes the address of a communication terminal (the communication device 10) that belongs to the user A, the user B can easily recognize that the user A has received the message.

According to the example illustrated in FIG. 2, the user A, who uses the communication device 10 which has received the position data, goes to the station at which the user B gets off. Note, however, that another user, other than the user of the communication device 10 which has received the position data, can go to pick up the user B.

In such a case, the communication device 10, which belongs to the user A and has received the position data in step S104, forwards, after receiving the position data in step S105, the position data to another communication device that belongs to the another user (referred to as user C) who actually goes to pick up the user B. Thereafter, instead of the communication device 10, the another communication device that belongs to the user C carries out the processes of subsequent steps shown in FIG. 2 (i.e., S106, S107, receiving process of S108, S114, S115, and receiving process of S117).

In that case, in step S114, a terminal address of the another communication device that belongs to the user C is added, as the second address, to the arrival confirmation data. A navigation device used here can be the navigation device 50 that belongs to the user A, or can be another car navigation device that belongs to the user C, as long as the address data of the communication device 80 is registered to the navigation device in the processes of S101 and S102.

Through these processes, in a case where the user A cannot go to pick up the user B for some reasons and therefore the another user C goes instead of the user A, the user B can recognize, upon receiving the arrival confirmation data, that the user C is actually coming.

Figure 3:
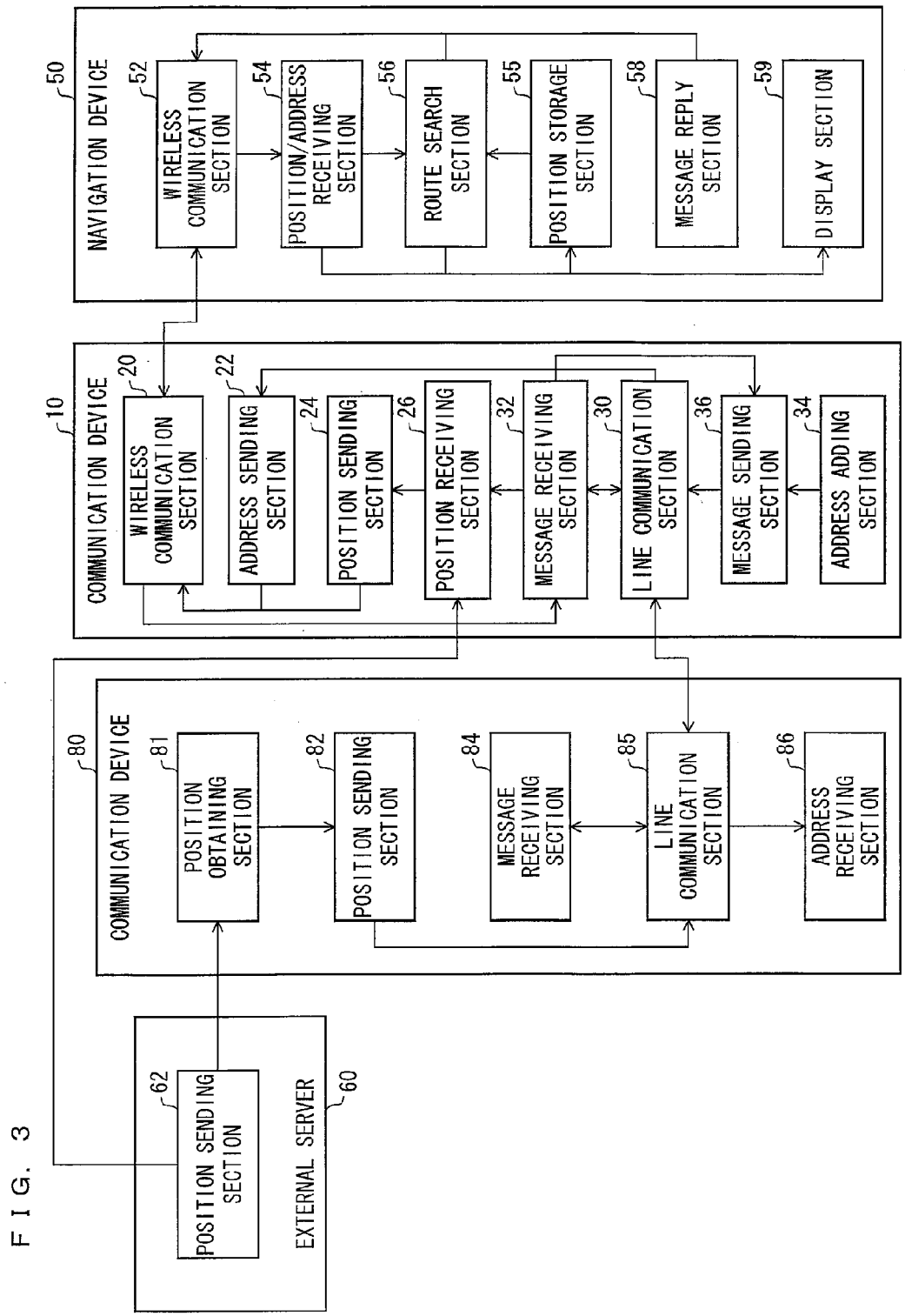
FIG. 3 is a functional block diagram illustrating how major functions of the communication system, which includes a communication device, a navigation device, an external server, and another communication device, are configured.
Figure 4:
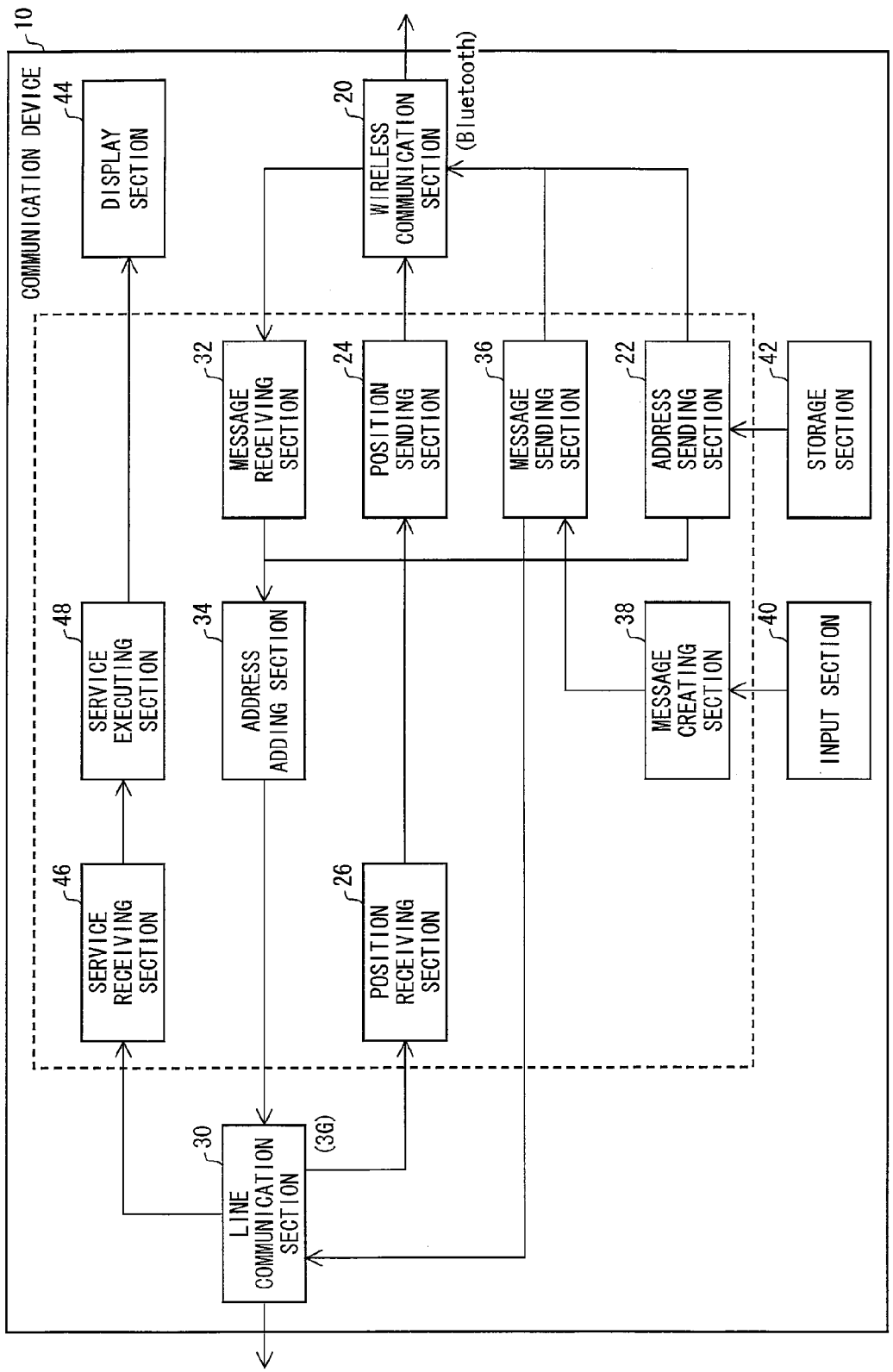
FIG. 4 is a functional block diagram illustrating how specifically the communication device is configured.
Figure 5:
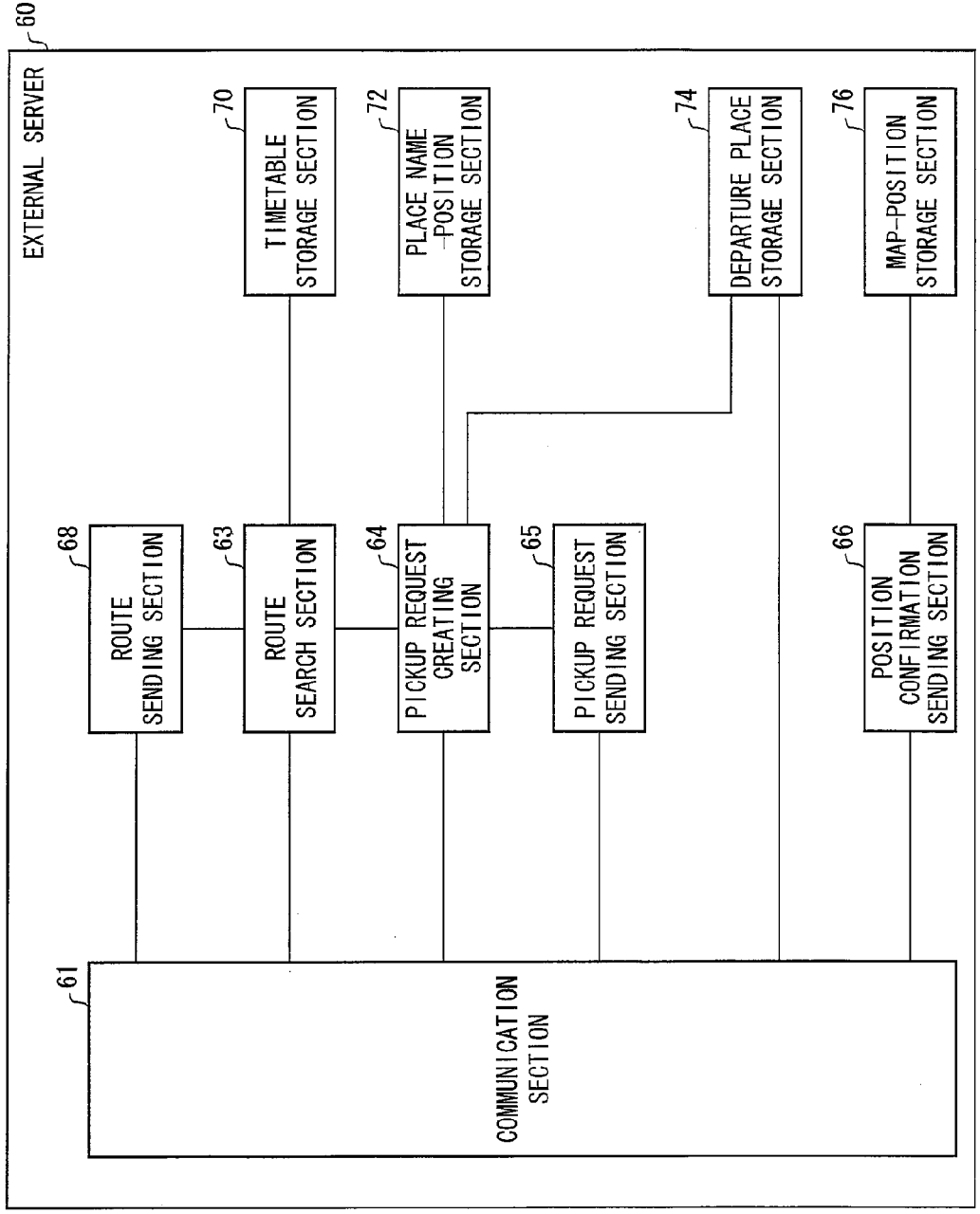
FIG. 5 is a functional block diagram illustrating how specifically the external server is configured.

Next, the following description discusses, with reference to FIGS. 3 through 5, details of configurations of the communication device 10, the navigation device 50, the external server 60, and the communication device 80, which are used in the present embodiment. FIG. 3 is a functional block diagram illustrating how main functions of the communication system, which includes the communication device 10, the navigation device 50, the external server 60, and the communication device 80, are configured. FIG. 4 is a functional block diagram illustrating how specifically the communication device 10 is configured. FIG. 5 is a functional block diagram illustrating how specifically the external server 60 is configured.

First, the following description discusses, with reference to FIG. 3, how the entire communication system is configured.

The communication device 10 includes: a wireless communication section (first communication means) 20; an address sending section (identification information sending means) 22; a position sending section (position sending means) 24; a position receiving section (position receiving means) 26; a line communication section (second communication means) 30; a message receiving section (message receiving means) 32; and an address adding section (identification information adding means) 34.

The wireless communication section 20 is a communication control section for connecting with the navigation device 50 via a short-distance wireless communication such as Bluetooth. The address sending section 22 obtains the address data (first address) from a storage section 42 (refer to FIG. 4) of the communication device 10, and then sends the address data to the navigation device 50 via the wireless communication section 20.

Table 1 shows one example of data structure of the address data.

TABLE 1

| Type of Data | Example |
| --- | --- |
| Name | Taro HAYAKAWA |
| Telephone Number | 090-1234-xxxx |
| Email Address | taro@mail.xxx.jp |

The address data shown in Table 1 includes a group of "name", "telephone number", and "email address", which are in association with one another. A plurality of such address data groups, each of which consists of the "name", "telephone number", and "email address", constitute an address book. The address data is for sending an email. Therefore, the address data is not particularly limited as long as it includes at least the "name" and the "email address". Further, the "name" is not particularly limited as long as it identifies a certain user.

The position receiving section 26 obtains an image attached to the pickup email sent from the communication device 80. Then, the position receiving section 26 sends a request to the external server 60 by sending an URL included in the obtained image, so as to obtain, from a position sending section 62 of the external server 60, information (the foregoing position confirmation information) regarding a position.

The position sending section 24 sends, to the navigation device 50, the image (i.e., the image in which the position data etc. of the "pickup place" are embedded) attached to the pickup email sent from the communication device 80. The image is sent to the navigation device 50 via the wireless communication section 20 via Bluetooth. Note that a data structure of the image is described later in detail.

The line communication section 30 is a communication section for connecting with a public telephone line and/or with the Internet via a mobile telephone network such as 3G. The message receiving section 32 is a process section for receiving a message from another device via the wireless communication section 20 or via the line communication section 30. The address adding section 34 is a process section for adding, to the message received from the navigation device 50, identification information (second address) for identifying the communication device 10.

The navigation device 50 includes: a wireless communication section 52; a position/address receiving section (identification information receiving means, position information receiving means) 54; a position storage section 55; a route search section (arrival time estimating means) 56; a message reply section (message generating means, message sending means) 58; and a display section (recipient presenting means) 59.

The wireless communication section 52 is a communication control section for connecting with the communication device 10 via the short-distance wireless communication such as Bluetooth. The position/address receiving section 54 (i) receives the position information and address data from the communication device 10, (ii) extracts information regarding the position from image information in which the position information is embedded, (iii) stores the extracted information to the position storage section 55, and (iv) converts the extracted information into a format that can be (a) displayed on the display section 59, (b) used for route search, (c) used for selection of a message recipient, and (d) the like.

The position storage section 55 is a storage section for storing the position information received by the position/address receiving section 54. The position information stored in the position storage section 55 is information often set as a destination by a user.

Table 2 shows one example of the position information stored in the position storage section 55.

TABLE 2

| Type of Data | Example |
| --- | --- |
| Registration Number | 1 |
| Point Name | Koriyama Station |
| Longitude Coordinate | N34° 3834 |
| Latitude Coordinate | E135° 4851 |

According to the example shown in Table 2, a line of "Registration Number" shows a number representing the order of registration; a line of "Point Name" shows textual information for identifying a registered point; and lines of "Longitude Coordinate" and "Latitude Coordinate" show coordinates of longitude and latitude of the registered point, respectively. Although Table 2 shows only one position information item, a plurality of position information items having different registration numbers can be stored.

A route search section 56 is a process section for realizing functions of a generally-used navigation device. The route search section 56 for example searches for a route and estimates an arrival time, on the basis of the position information received by the position/address receiving section 54.

A message reply section 58 is a process section for creating a reply message to the pickup email that the communication device 10 received from the communication device 80. The reply message created by the message reply section 58 is sent to the communication device 10. The communication device 10 creates a pickup notification email by adding, to the reply message, an email address of the communication device 10 which email address serves as a sender of the reply message. Then, the communication device 10 sends the pickup notification email to the communication device 80. This allows the user B of the communication device 80 to recognize that the user A will come to pick up the user B.

The reply message to the pickup email can be created automatically by the message reply section 58. Alternatively, it is possible to employ a configuration in which the user A, who uses the navigation device 50, manually adds a message to a generated fixed phrase (e.g., an estimated arrival time or a message notifying of the user A coming to pick up).

Table 3 shows one example of the reply message to the pickup email.

TABLE 3

| Type of Data | Example |
| --- | --- |
| Title | Pickup Notification Email |
| Recipient (TO) | taro@mail.xxx.jp |
| Body Text | This is a pickup notification email from X. X will arrive at Tsudayama at 19:32. Current position of X is Narashino-shi Yamada. |

According to the example of Table 3, a line of "Title" shows a character string representing a subject of the reply message; a line of "Recipient (TO)" shows an email address of a recipient; and a line of "Body Text" shows character strings sent as an email and information on attached data.

The display section 59 displays: various information items received by the position/address receiving section 54; route information found by the route search section 56; and various information items necessary for the navigation device 50 to operate.

The external server 60 includes the position sending section 62. The position sending section 62 sends, to the communication device 10 or the communication device 80 which has externally accessed the external server 60 by using a URL, the position confirmation information corresponding to the URL. The position confirmation information is for example map information or facilities information.

The communication device 80 includes: a position obtaining section 81; a position sending section 82; a message receiving section 84; a line communication section 85; and an address receiving section 86.

The position obtaining section 81 obtains the position data of the "pickup place". Specifically, the position obtaining section sends, to the external server 60, information (e.g., a station name) for specifying the position of the "pickup place" so as to receive, from the external server 60, image data in which the position data of the "pickup place" is embedded. The position sending section 82 sends, to the communication device 10, the image data received by the position obtaining section 81. The image data, which serves as the position data of the "pickup place", is sent to the communication device 10 via the line communication section 85.

Table 4 shows one example of an email to be sent, which email includes the image data in which the position data of the "pickup place" is embedded.

TABLE 4

| Type of Data | Example |
| --- | --- |
| Title | Pickup Request (user input) |
| Recipient (TO) | akira@mail.xxx.jp |
| Sender (FROM) | taro@mail.xxx.jp |
| Body Text | Please come to pick me up. (user input) |
| Attachment | (image data) |

According to the example of Table 4, a line of "Title" shows a character string representing a subject of the email; a line of "Recipient (TO)" shows an email address of a recipient; a line of "Sender (FROM)" shows an email address of a sender; a line of "Body Text" shows a character string inputted by the user B; and a line of "Attachment" shows image data attached to the email. In the image data, the position data of the "pickup place" is embedded. A data structure of the image data is described later.

The message receiving section 84 is a process section for receiving a message (in the present embodiment, a message sent by email) from the communication device 10 via the line communication section 85. The address receiving section 86 is a process section for receiving an address from the communication device 10 via the line communication section 85. Note here that the address received by the address receiving section 86 is the identification information, for identifying the communication device 10, which is added by the address adding section 34 of the communication section 10. The line communication section 85 is a communication section for connecting with a public telephone line and/or with the Internet via a mobile telephone network such as 3G. The line communication section 85 allows also for sending and receiving of emails.

Next, the following description discusses, with reference to FIG. 4, how specifically the communication device 10 is configured. Note here that blocks having functions identical to those illustrated in FIG. 3 are assigned identical names and identical referential numerals, and their descriptions are omitted here. The communication device 10 further includes: a message sending section (message sending means) 36; a message creating section 38; an input section 40; the storage section 42; a display section 44; a service receiving section 46; and a service executing section 48.

The input section 40 is an input device for receiving various input operations to the communication device 10. The storage section 42 is a memory device (i) which is constituted by a semiconductor element, a magnetic storage medium, or the like and (ii) in which various data such as the address book, setting information, an application, and the like for use in the communication device 10 are stored. The display section 44 is a display output device for displaying various output screens such as execution results of various applications executed by the service executing section 48.

The service receiving section 46 receives, from the external server 60 etc., display screen data expressed in HTML, XML, or the like; an executable application; and the like. The service executing section 48 is an executing section for activating a browser, an application engine, and the like. The service executing section 48 deploys and executes data received by the service receiving section 46, and supplies the execution results to the display section 44.

Next, the following description discusses, with reference to FIG. 5, how specifically the external server 60 is configured. The external server 60 includes: a communication section 61; the position sending section 62; a route search section 63; a pickup request creating section 64; a pickup request sending section 65; a position confirmation sending section 66; a timetable storage section 70; a place name-position storage section 72; a departure place storage section 74; and a map-position storage section 76.

The communication section 61 is a communication control section for controlling connections with a network via a public telephone line or the like.

The route search section 63 searches for a train route and train transfer information with reference to a timetable and train route information stored in the timetable storage section 70, and estimates an arrival time at a station at which a user gets off. The pickup request creating section 64 creates a pickup request on the basis of (i) the train route and the arrival time found by the route search section 63, (ii) position information of the pickup place obtained from the place name-position storage section 72, (iii) position information, of the station at which the user gets off, which is obtained from the departure place storage section 74, (iv) and/or the like. The pickup request sending section 65 sends, to the communication device 80 via the communication section 61, the pickup request created by the pickup request creating section 64.

The position confirmation sending section 66 sends, via the communication section 61, position confirmation information in response to the position confirmation information (pickup place confirmation) sent by the communication device 10 in step S107 in FIG. 2. The position confirmation information is for example a corresponding map and/or corresponding facilities information.

Stored in the timetable storage section 70 are: train timetable information, the train route information; the train transfer information; traveling time information; and other time information regarding trains. Stored in the place name-position storage section 72 are: place name information; information, indicating a position, such as longitude and latitude information corresponding to the place name information; and the like. Stored in the departure place storage section 74 is: information indicating a position of a departure place of the communication device 10, which place is specified by the communication device 80. Stored in the map-position storage section 76 are: map information; information, indicating a position, such as longitude and latitude information corresponding to the map information; and the like.

Figure 6:
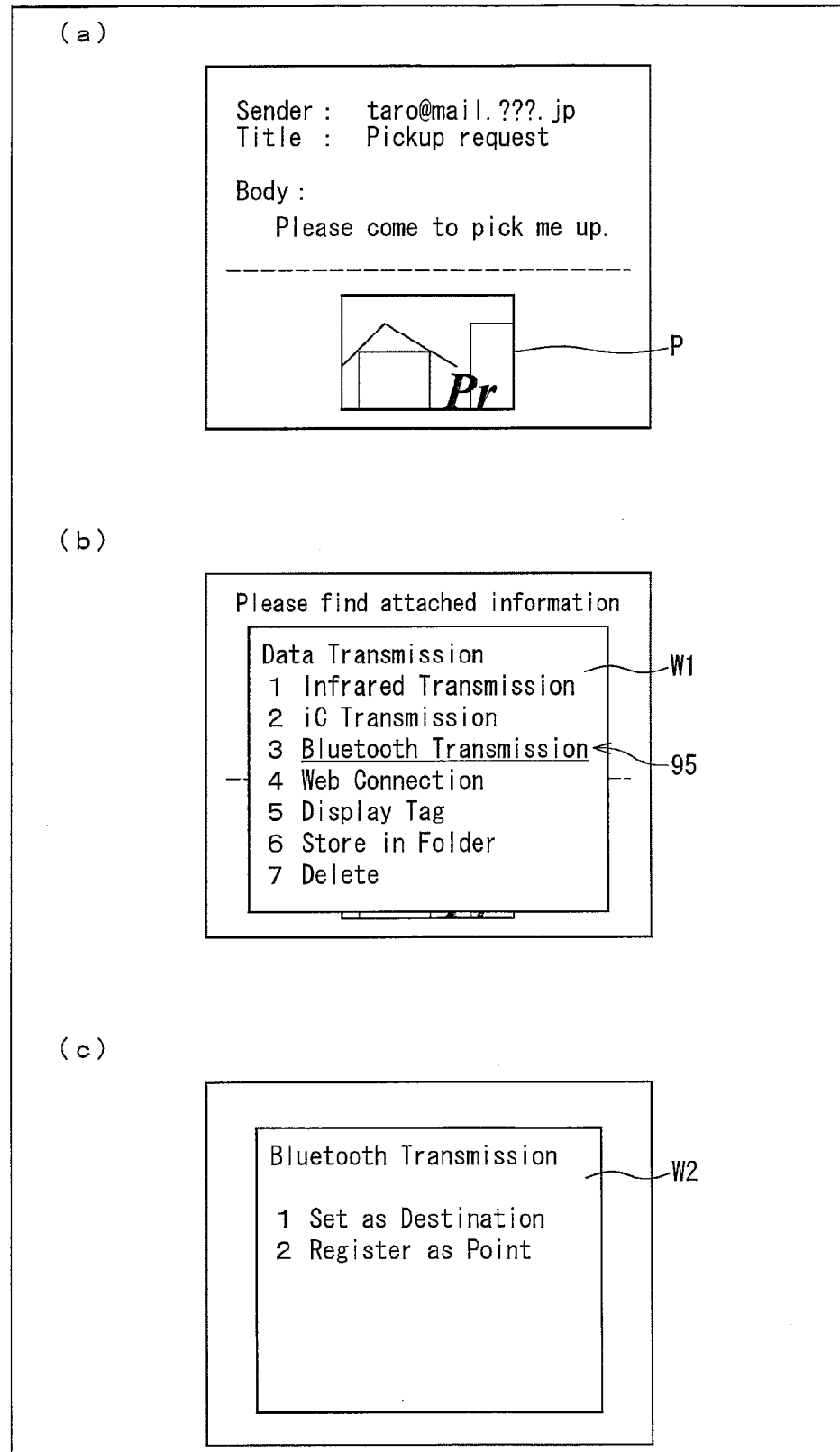
FIG. 6 (a) through (c) of FIG. 6 schematically illustrate one example of how a pickup email is sent from the another communication device.

Next, the following description discusses, with reference to FIG. 6, one example of input operation screens displayed when a pickup email is sent from the communication device 10. (a) of FIG. 6 illustrates one example of a screen displayed when the "pickup place" information obtained from the external server 60 is sent by a pickup email. The display screen includes an image P in which the "pickup place" information is embedded. The image P can be selected by an input operation to the communication device 10. The display screen can be created from the data shown in Table 4.

In a case where the image P is selected while the display screen of (a) of FIG. 6 is being displayed, an operation menu window W1 illustrated in (b) of FIG. 6 is displayed. The window W1 is for operations such as sending the image P to another device, and includes options 1 through 7. Further, a cursor 95 is displayed on the window W1. Any of the options 1 through 7 can be selected by moving the cursor 95 by an input operation to the communication device 10.

Selection of an option "1 Infrared Transmission" causes the image P to be sent to another device via infrared communication. Selection of an option "2 IC Transmission" causes the image P to be sent to another device via IC transmission. Selection of an option "3 Bluetooth Transmission" causes the image P to be sent to another device via Bluetooth.

Upon selection of an option "4 Web Connection", a URL included in the image P is accessed via a web connection. Selection of an option "5 Display Tag" causes a tag of the image P to be displayed. Selection of an option "6 Store in Folder" causes the image P to be stored in a folder specified by a user. Selection of an option "7 Delete" causes the image P to be deleted.

Note that the following description is based on the assumption that the communication device 10 sends the "pickup place" information, i.e., the image P, to the navigation device 50 via Bluetooth. Therefore, in the display screen of (b) of FIG. 6, the option "3 Bluetooth Transmission" is selected. Although the image P is sent in response to a user operation in this example, it is also possible to employ a configuration in which the communication device 10 automatically sends the image P to the navigation device 50 when the communication device 10 detects that the communication device 10 and the navigation device 50 are within a range where they can communicate with each other via Bluetooth.

(c) of FIG. 6 shows a window W2, which is displayed upon selection of the option "3 Bluetooth Transmission" in (b) of FIG. 6. As illustrated in (c) of FIG. 6, the window W2 includes two options of "1 Set as destination" and "2 Register as point" displayed in a user selectable manner.

In a case where the option "1 Set as destination" is selected, the position data embedded in the image P is registered to the position storage section 55 as a destination of a route guidance carried out by the navigation device 50. Then, the route guidance is started. On the other hand, in a case where the option "2 Register as point" is selected, the position data embedded in the image P is registered to the position storage section 55 as a candidate for the destination of the route guidance carried out by the navigation device 50.

Figure 7:
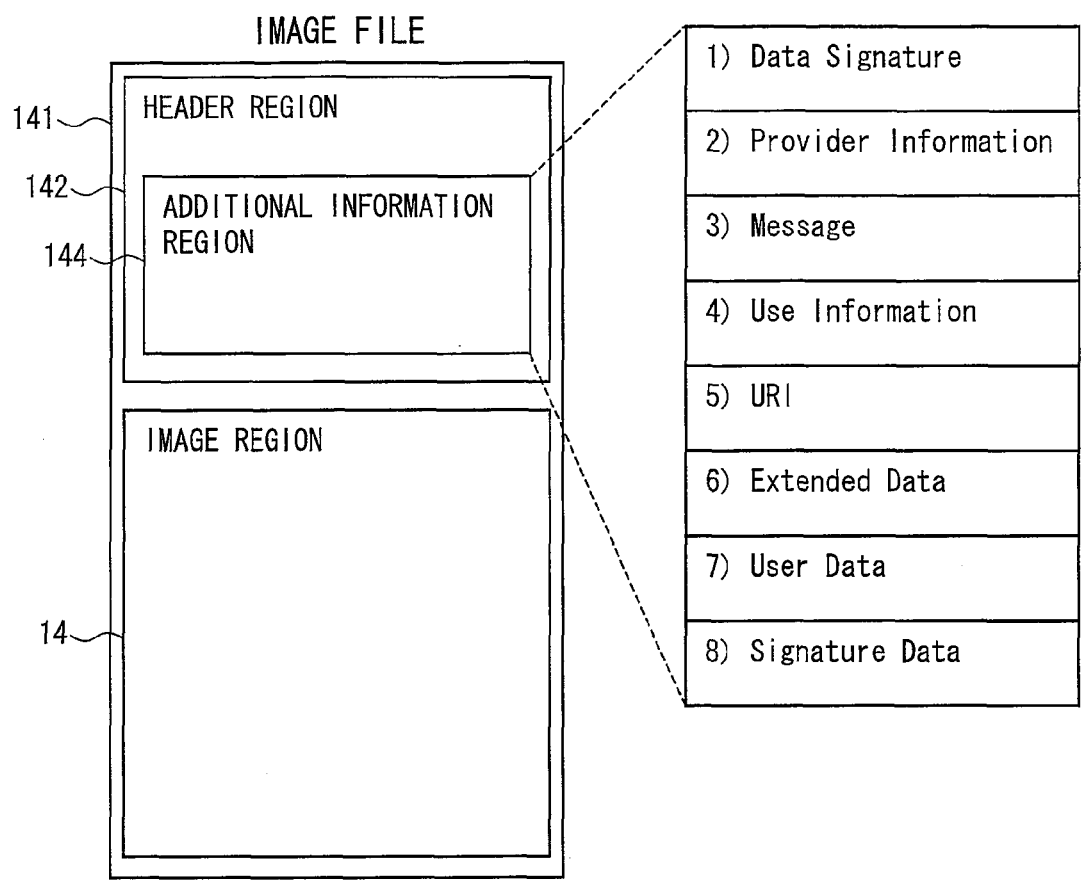
FIG. 7 is a conceptual view illustrating one example of a data structure of image data in which position data etc. are embedded.

Next, the following description discusses, with reference to FIG. 7, one example of a data structure of an image file (the image data in which the position data etc. are embedded), which is (i) sent from the communication device 80 to the communication device 10 by the pickup email and then (ii) sent to the navigation device 50. FIG. 7 is a conceptual view illustrating one example of a data structure of the image data in which the position data etc. are embedded.

As illustrated in FIG. 7, image data 141 includes a header region 142 and an image region 14. The header region 142 includes, in its free space at the end, an additional information region 144. The additional information region 144 contains: 1) Data Signature; 2) Provider Information; 3) Message; 4) Use Information; 5) URI; 6) Extended Data; 7) User Data; and 8) Signature Data.

The 1) Data Signature is information indicating that the data is in an operation image data format. The data signature includes also version information.

The 2) Provider Information is represented as a UTF-8 character string terminated with "¥0", and indicates a provider.

The 3) Message is represented as a UTF-8 character string terminated with "¥0", and indicates a message. Each of the communication device 10 and the navigation device 50 is preferably capable of displaying at least sixteen characters from the beginning of the provider information and/or the message.

The 4) Use Information is represented as a UTF-8 character string terminated with "¥0". How to use the use information depends on the specifications of the navigation device 50. For example, the use information can be used for selecting an application to be activated.

The 5) URI is represented as a character string terminated with "¥0", and is a URI of data to be obtained by the communication device 10. The 5) URI shows a URL which is sent to the external server 60 when the position confirmation request is sent in step S107 of FIG. 2. The URI is described in a URL format, such as for example "http://www.xxxservice-.ne.jp/data.cgi?lat=N343834&long=E1354851". The URL specifies a place where a service running on the external server 60 is provided, and includes a character string indicating coordinates of a position (pickup place) embedded in the image data.

The 6) Extended Data is arbitrary binary data. In order to support the binary data, the communication device 10 and the navigation device 50 are preferably configured so as to handle the extended data of at least 2048 bytes. The extended data includes the position data indicating the pickup place.

Table 5 shows one example of the position data included in the extended data.

TABLE 5

| Type of Data | Example |
| --- | --- |
| Registration Number | 1 |
| Point Name | Koriyama Station |
| Longitude Coordinate | N34° 3834 |
| Latitude Coordinate | E135° 4851 |

According to the example of Table 5, a line of "Registration Number" shows a number indicating the order of registration; a line of "Point Name" shows textual information for identifying a registered point; and lines of "Longitude Coordinate" and "Latitude Coordinate" show coordinates of longitude and latitude of the registered point, respectively. Although Table 5 shows the example in which the pickup place is represented as coordinates of longitude and latitude, the pickup place can be expressed in for example POIX (Point of Interest Exchange Language), which is a generally-used description language for specifying positions.

The 7) User Data is arbitrary binary data. In order to support the user data, the communication device 10 and the navigation device 50 are preferably configured so as to handle the user data of at least 2048. Note that, in a case where a size of the user data is more than 2048 bytes, the excess bytes may not be processed by the communication device 10 and the navigation device 50. The extended data and the user data are different from each other in that the extended data can have a digital signature while the user data cannot.

Therefore, this region is writable also to a device other than the device which has generated the image data (e.g., a device other than the external server 60). For example, the communication device 80 can write its email address to this region of the data, and then send the data to the communication device 10 (corresponding to the position data transmission (S105) of FIG. 2).

The 8) Signature Data is a digital signature in accordance with pkcs#7/DER. The Signature Data can include a certificate, of a certificate chain, which is other than a root certificate. Since the image data 141 is verified by checking its digital signature, it is possible to avoid the use of the image data 141 if the image data 141 is from an untrusted source.

Figure 8:
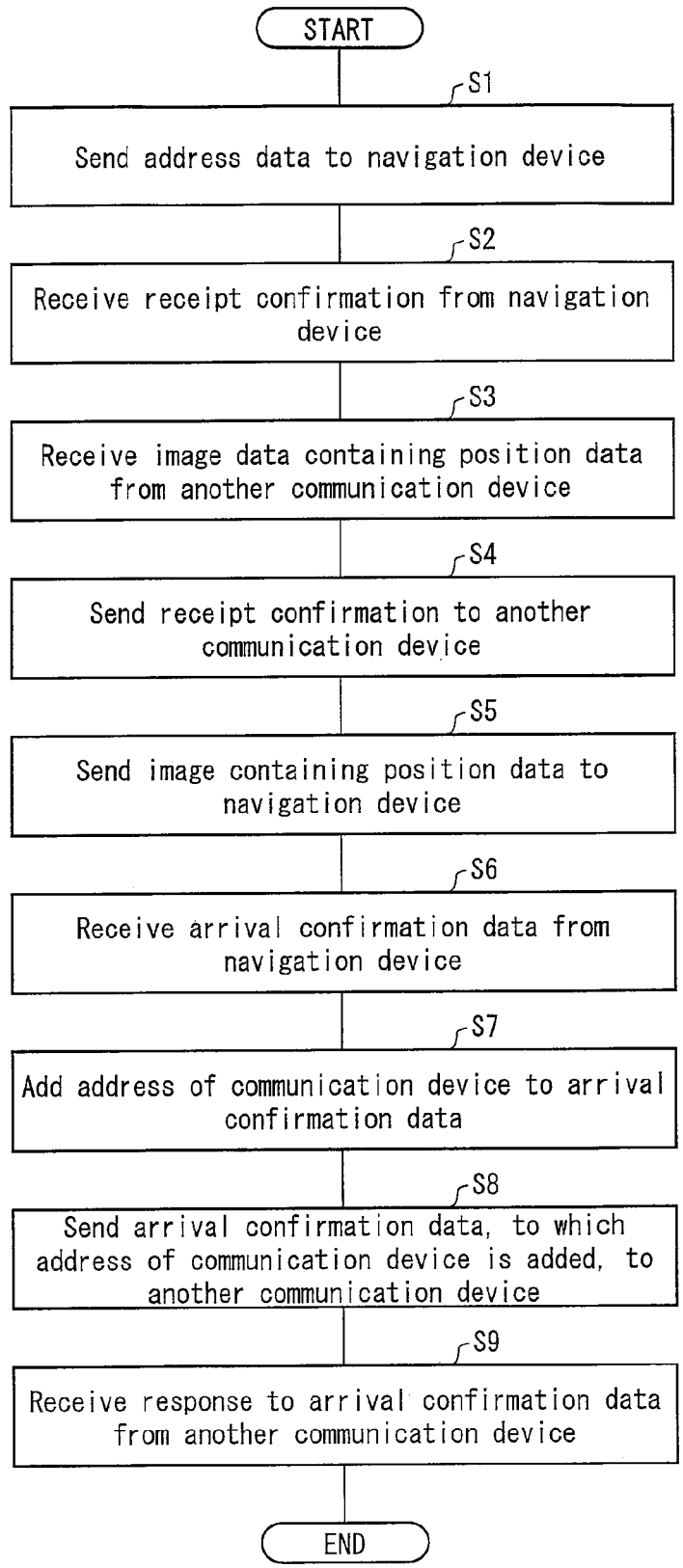
FIG. 8 is a flowchart illustrating how the communication device carries out processes, which communication device (i) belongs to a user who goes to a pickup place and (ii) communicates with the navigation device.

Next, the following description discusses, with reference to FIG. 8, how processes are carried out by the communication device 10 which belongs to the user A who goes to the pickup place to pick up the user B. FIG. 8 is a flowchart illustrating one example of how the communication device 10 carries out the processes. FIG. 8 shows the processes carried out in a case where (i) the user A is in a vehicle in which the navigation device 50 is installed and (ii) the communication device 10 and the navigation device 50 are within a range where they can communicate with each other via Bluetooth.

In step S1, the address sending section 22 sends address data (first address) to the navigation device 50 via the wireless communication section 20 (step S1 corresponds to step S101 of FIG. 2). The navigation device 50 sends, upon receiving the address data, a receipt confirmation thereof to the communication device 10. In step S2, the wireless communication section 20 receives the receipt confirmation (step S2 corresponds to step S102 of FIG. 2).

Meanwhile, the communication device 80 sends a pickup email the communication device 10. The position receiving section 26 of the communication device 10 receives the pickup email via the line communication section 30. Since the pickup email has attached thereto image data including position data of the pickup place, the communication device 10 in step S3 receives the image data including the position data of the pickup place (step S3 corresponds to step S105 of FIG. 2).

Next, in step S4, the message sending section 36 sends, to the communication device 80, a receipt confirmation email indicating that the image data including the position data has been received in step S3 (step S4 corresponds to step S106 of FIG. 2).

Next, in step S5, the position sending section 24 sends, to the navigation device 50, the image data including the position data received in step S3 (step S5 corresponds to step S109).

Meanwhile, the navigation device 50 sends, upon receiving the image data including the position data, arrival confirmation data to the communication device 10. In step S6, the message receiving section 32 of the communication device 10 receives the arrival confirmation data (step S6 corresponds to step S113 of FIG. 2).

Upon receiving the arrival confirmation data, the address adding section 34 in step S7 adds an address (second address) of the communication device 10 to the arrival confirmation data (step S7 corresponds to step S114 of FIG. 2).

Then, in step S8, the message sending section 36 sends, to the communication device 80, the arrival confirmation data to which the second address is added in step S7. Lastly, in step S9, the message receiving section 32 receives, from the communication device 80, response data to the arrival confirmation data sent in step S7 (step S9 corresponds to step S117 of FIG. 2). This finishes a series of processes carried out by the communication device 10.

Figure 9:
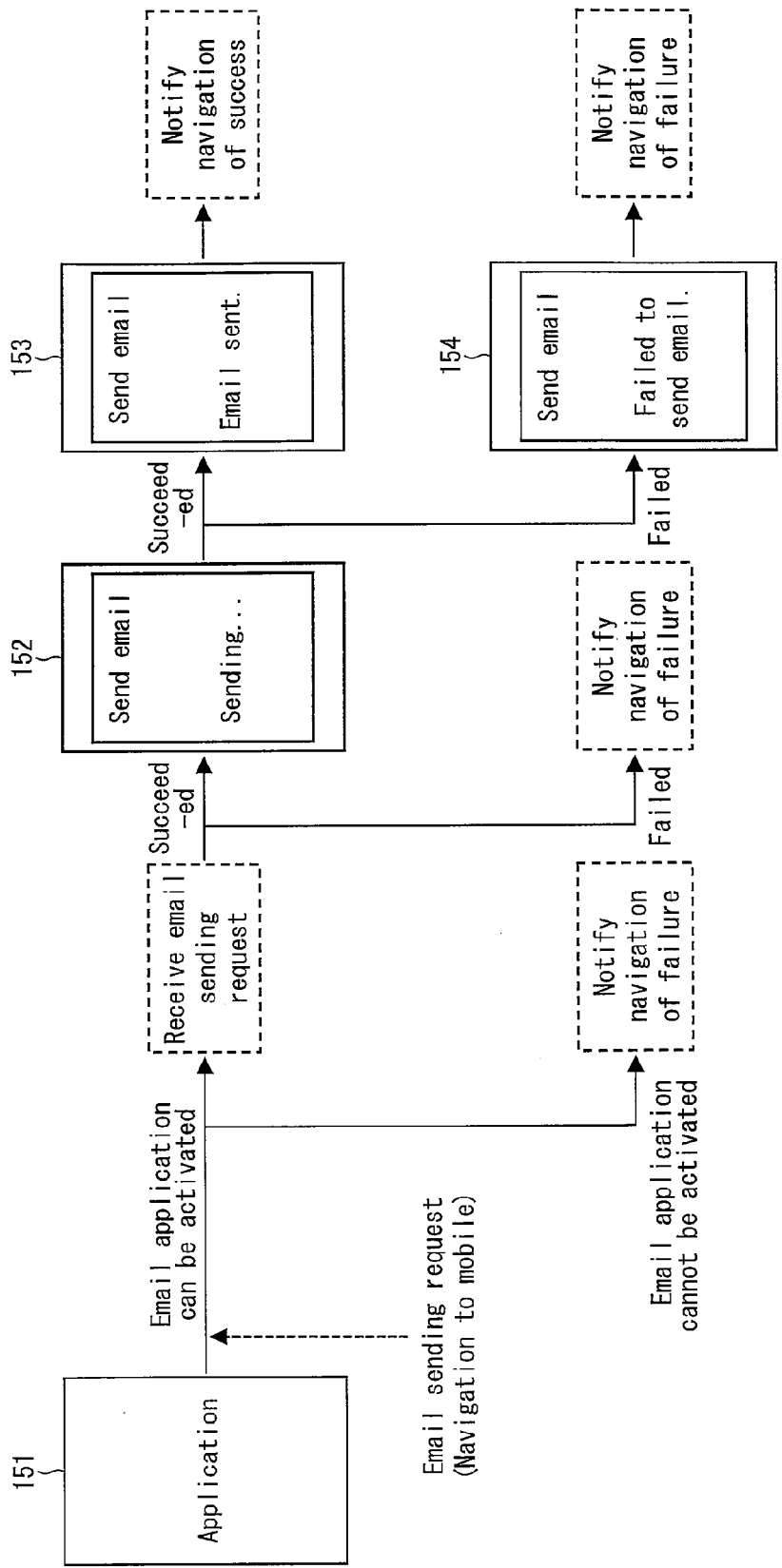
FIG. 9 is a conceptual view illustrating (i) a transition of screens displayed when the pickup email is sent and (ii) success and failure of sending the pickup email.

Next, the following description discusses, with reference to FIG. 9, (i) a transition of screens displayed when the pickup notification email is sent and (ii) success and failure of sending the pickup notification email.

First, a standby screen is displayed or an application is active on a screen 151 of the communication device 10. Under such condition, the navigation device 50 sends, together with the arrival confirmation data (step S113 of FIG. 2), an email sending request to the communication device 10. The communication device 10 tries to activate an email application; however, if the email application cannot be activated, then the communication device 10 notifies the navigation device 50 that the email application cannot be activated.

In a case where the email application is activated, the communication device 10 sends an email with use of the arrival confirmation data received by the navigation device 50. If this is successful, a screen 152 is displayed. If this fails, then the communication device 10 notifies the navigation device 50 of the failure.

In a case where the email is successfully sent as a result of the above process, a screen 153 is displayed and the communication device 10 notifies the navigation device 50 that the email has been sent successfully. On the other hand, in a case where the email was not sent, a screen 154 is displayed, and the communication device 10 notifies the navigation device 50 that the email was not sent.

Next, the following description further discusses, with reference to FIGS. 10 through 13, how processes are carried out when the user A receives the pickup email on the communication device 10 and then goes to pick up the user B by a vehicle in which the navigation device 50 is installed.

Figure 10:
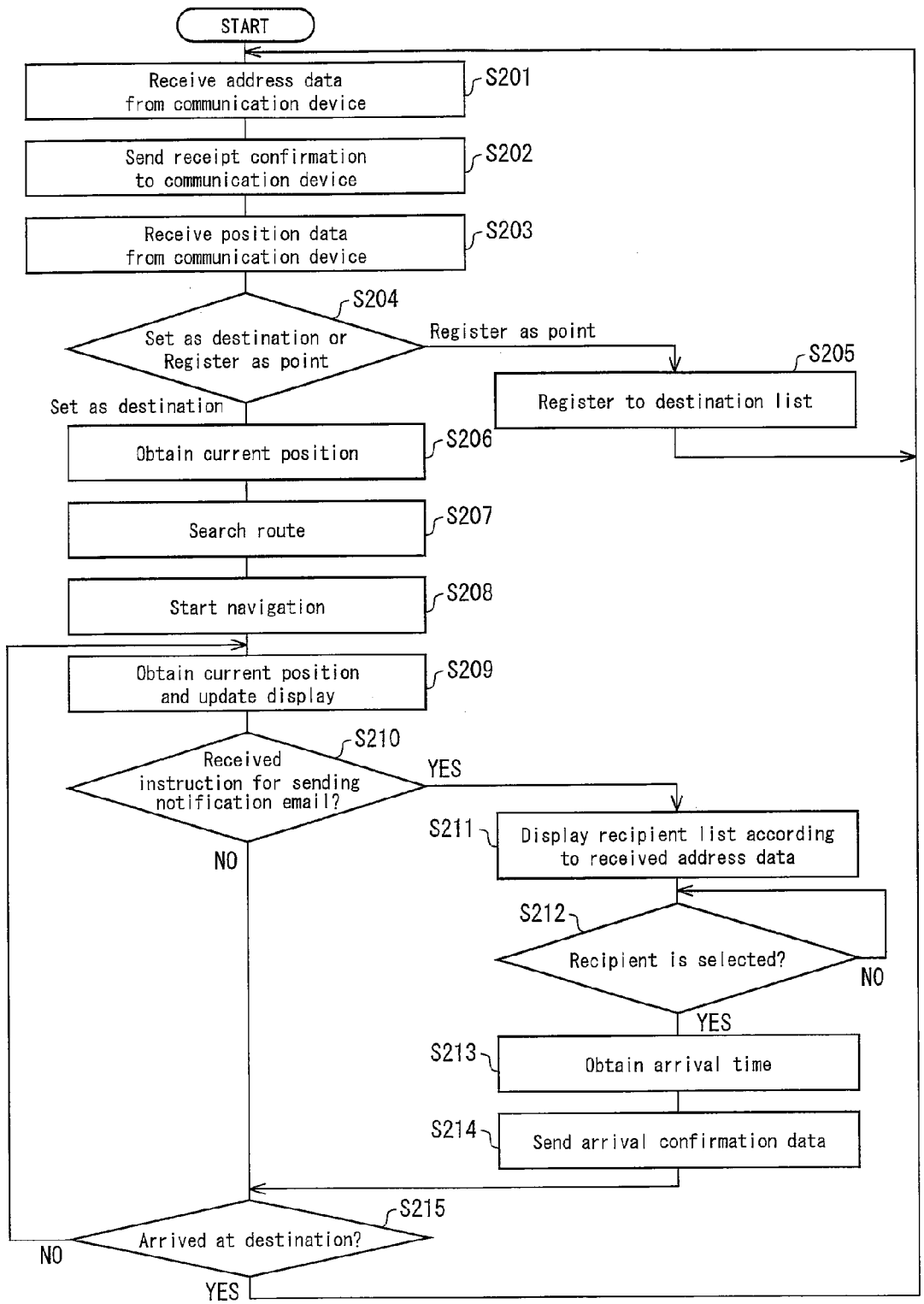
FIG. 10 is a flowchart illustrating how the communication device and the navigation device carry out processes.

FIG. 10 is a flowchart illustrating one example of how the navigation device 50 carries out processes before the user A in the vehicle arrives at a destination. FIG. 11 is a view illustrating examples of screens displayed during the processes of the flowchart of FIG. 10. FIG. 12 is a conceptual view illustrating one example of what movements are carried out before the communication device 10 and the navigation device 50 arrive at the destination.

First, the following description discusses, with reference to FIG. 10, how the navigation device 50 carries out processes. Note that the flowchart of FIG. 10 exemplifies a case where the position data indicating the pickup place is sent from the communication device 80 to the communication device 10 as image data in which a URL is embedded.

First, in step S201, the navigation device 50 receives address data (first address) from the communication device 10 (step S201 corresponds to step S101 of FIG. 2). Next, in step S202, the navigation device 50 sends, to the communication device 10, a receipt confirmation indicating that the navigation device 50 has received the first address (step S202 corresponds to step S102 of FIG. 2).

In step S203, the navigation device 50 receives the position data from the communication device 10 (step S203 corresponds to step S109 of FIG. 2). As described earlier, the position data is received as the image data in which the position data is embedded.

Further, as illustrated in (c) of FIG. 6, the communication device 10 selects whether a position indicated by the position data is to be set as a destination or to be registered as a point when the communication device 10 sends the image data in which the position data is embedded to the navigation device 50. Specifically, in step S203, the navigation device 50 receives, together with the image data in which the position data is embedded, data indicating that the position is to be set as the destination or to be registered as the point.

In step S204, the navigation device 50 sets the position as the destination or registers the position as the point in accordance with the received data which indicates that the position is to be set as the destination or to be registered as the point. In a case where the position is set as the destination ("Set as destination" in step S204), the navigation device 50 extracts the position data from the image data sent by the communication device 10, and then sets the position indicated by the position data as the destination. Then, the process proceeds to step S206. On the other hand, in a case where the position is registered ("Register as point" in step S204), the process proceeds to step S205.

In step S205, the route search section 56 of the navigation device 50 registers, to the position storage section 55 (refer to FIG. 3), the position indicated by the position data included in the image data. Then, the process returns to step S201. The registration of positions often set as destinations, like above, simplifies the subsequent destination settings.

Meanwhile, in step S206, the route search section 56 obtains position information of a current position with use of for example GPS. In step S207, the route search section 56 searches for a route from the current position obtained in step S206 to the destination set in step S204. Then, in step S208, the route search section 56 starts navigation from the current position to the destination. Then, in step S209, the navigation device 50 again obtains a current position, as the vehicle moves, so as to update the display.

In step S210, the message reply section 58 of the navigation device 50 determines whether or not the user A has instructed to send a notification email (pickup notification email). If it is determined that the user A has instructed to send the notification email (YES in step S210), the process proceeds to step S211. If it is determined that the user A has not instructed to send the notification email (NO in step S210), the process proceeds to step S215.

In step S211, the navigation device 50 causes, in accordance with the address data sent from the communication device 10 in step S201, the display section 59 to display a recipient list in such a manner that the user A can select a recipient. The recipient list displayed is for example the list illustrated in (a) of FIG. 11. According to the example of (a) of FIG. 11, the recipient list includes: an email address of "Mother", i.e., "mama@???.ne.jp"; an email address of "Daughter", i.e., "musume@???.ne.jp"; and an email address of "Mr. Suzuki", i.e., "suzuki@??.co.jp".

In step S212, the navigation device 50 determines whether or not a recipient of the notification email is selected. If it is determined that the recipient is selected from the displayed recipient list, the navigation device 50 causes the display section 59 to display a screen where the user A selects whether or not to send the notification email to the selected email address.

The screen displayed is for example an image illustrated in (b) of FIG. 11. According to the example of (b) of FIG. 11, the "Daughter", which is the selected recipient, and the "musume@???.ne.jp", which is the email address of the "Daughter", are displayed. Along with these, buttons for selecting whether or not to send the notification email are displayed. This makes it possible for the user A to ensure that the recipient is correct, before the pickup notification email is sent. Further, in a case where the recipient is wrong in any way, the user A can correct the recipient of the pickup notification email.

In a case where the recipient is selected and then the notification email is determined to be sent (YES in step S212), the process proceeds to step S213. On the other hand, in a case where the notification email is determined not to be sent (NO in step S212), the process returns to step S212. The display of the recipient list is repeated until the notification email is determined to be sent to a certain recipient.

In step S213, the message reply section 58 obtains, from the route search section 56, an estimated arrival time at which the user A in the vehicle arrives at the destination. In step S214, the message reply section 58 sends, to the communication device 10, the estimated arrival time obtained in step S211. The estimated arrival time has attached thereto a message inputted by the user A or a fixed phrase, and is sent to the communication device 10 as the arrival confirmation data. The arrival confirmation data is for example email data illustrated in (c) of FIG. 11.

Note here that, although the email data of (c) of FIG. 11 is to be sent to the user B of the communication device 80, the navigation device 50 sends the email data (arrival confirmation data) not directly to the communication device 80, but to the communication device 10. Then, the communication device 10 adds its identification information (second address) to the arrival confirmation data, and then sends the arrival confirmation data to the communication device 80 as the pickup notification email. The identification information is not particularly limited as long as it enables the user B to recognize that the pickup notification email is sent from the user A of the communication device 10. For example, the identification information can be an email address, such as "taro@mail.xxx.jp", of the communication device 10.

In step S215, the route search section 56 of the navigation device 50 determines whether or not the vehicle in which the navigation device 50 is installed has arrived at the destination. If it is determined that the vehicle has arrived at the destination, the process returns to step S201. If it is determined that the vehicle has not arrived at the destination, the process returns to step S209, and then the process of updating information on the current position and the process of sending the arrival confirmation data are repeated until the vehicle arrives at the destination.

Next, the following description discusses, with reference to FIGS. 12 and 13, how processes are carried out until the user B picks up the user A.

First, in 1), a user 161 (user B) sends, to the external server 60, information indicating that "Departure station is A station; Arrival station (a station at which the user B gets off, i.e., the pickup place) is B station; Departure time is 18:55; and Departure place of a user 162 (user A) is Narashino-shi, Yamada" (this step corresponds to (a) of FIG. 13).

Next, in 2), the external server 60 obtains, with reference to the timetable storage section 70 on the basis of the information received in 1), an arrival time (19:27) at the arrival station (B station). Then, the external server 60 finds a pickup time (19:32) by taking into consideration a time (five minutes after the arrival at the B station) at which the user B wants the user A to come.

Further, the route search section 63 of the external server 60 (i) searches for a route from the departure place of the user 162 (user A) to the arrival station (B station), (ii) finds a time (fifteen minutes) required for the user 162 to get to the B station, and (iii) finds a departure time (19:17) of the user 162 (user A) by subtracting the time required from the pickup time.

In this way, the external server 60 obtains information indicating that: Departure station is A station; Train departure time is 19:00; Arrival station is B station; Arrival time is 19:27; Departure place of the user 162 (user A) is Narashino-shi, Yamada; and Departure time of the user 162 (user A) is 19:17. Then, the external server 60 generates image data including (i) the above information items and (ii) a URL for obtaining (a) position information of the arrival station and (b) information on a map of an area around the position indicated by the position data or on facilities in this area, and then sends the image data to the user 161.

Next, in 3), a mobile phone 80 of the user 161 generates a message body including the departure place of the user 162, the departure time of the user 162, the pickup time, and the pickup place (this step corresponds to (b) of FIG. 13). Then, the mobile phone 80 sends, to the communication device 10, a pickup email to which the received image data is attached.

The communication device 10 displays, upon receiving the pickup email, for example an image illustrated in (c) of FIG. 13. According to the example of (c) of FIG. 13, the image includes the departure place of the user 162, the departure time of the user 162, the pickup place, the pickup time, and the attached image.

Figure 14:
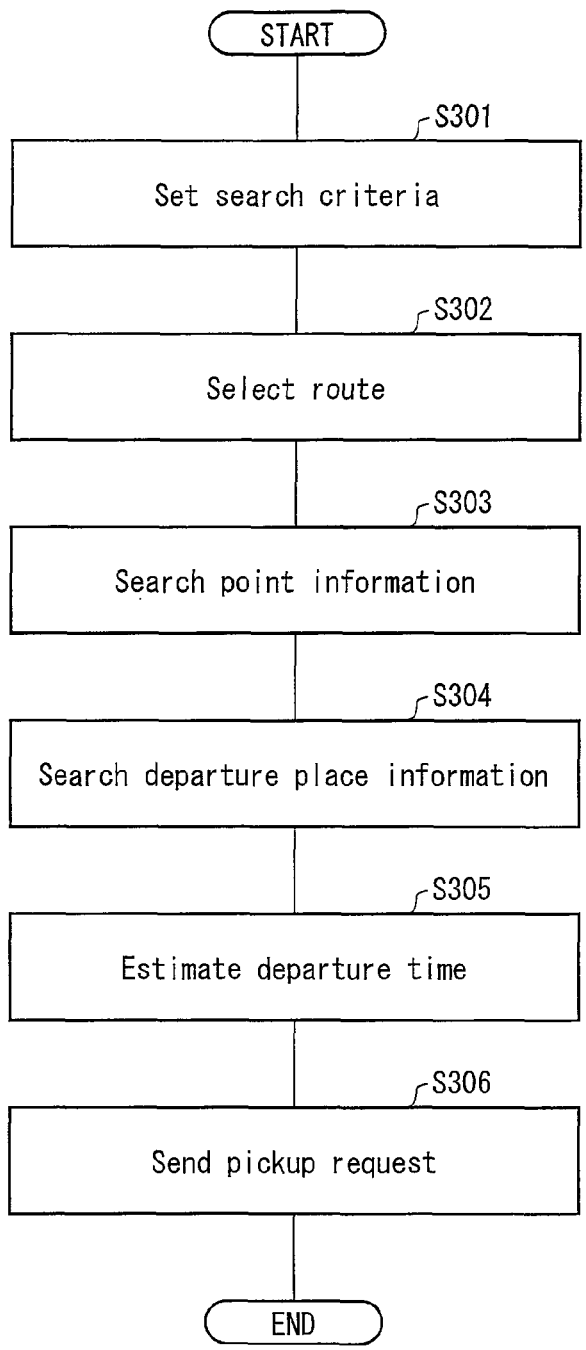
FIG. 14 is a flowchart illustrating how the external server carries out processes.

Next, the following description discusses, with reference to FIG. 14, how the external server 60 carries out processes. In step S301, the route search section 63 of the external server 60 sets, as search criteria for searching a train, (i) the departure station, (ii) the arrival station, (iii) the departure time of the user 161, and (iv) a time period between the train arrival time and the pickup time, which are received from the communication device 80 via the communication section 61.

Further, the route search section 63 stores, to the departure place storage section 74, the departure place of the user 162 (user A) sent from the communication device 80.

In step S302, the route search section 63 searches for a train from the departure station of the user 161 to the arrival station of the user 161 so as to find a train route and estimates the arrival time at the arrival station, with reference to the timetable storage section 70 on the basis of the departure station, and the departure time.

In step S303, the position confirmation sending section 66 searches for point information (position confirmation information) of the pickup place. Specifically, the position confirmation sending section 66 searches for, with reference to the map-position storage section 76, a map corresponding to a position of the arrival station. Then, the position confirmation sending section 66 sends, to the communication device 10, the map serving as the position confirmation information. Note here that the position confirmation sending section 66 can send, together with the position confirmation information, also facilities information and traffic jam information etc. in an area around the station.

In step S304, the pickup request creating section 64 retrieves, from the departure place storage section 74, the departure place of the specified user 162 (user A).

In step S305, the pickup request creating section 64 estimates, on the basis of the information obtained in step S301, S302, and S304, a time at which the user 162 (user A) should leave for the pickup place.

Specifically, the pickup request creating section 64 finds the time at which the user 162 (user A) should arrive at the arrival station, by adding (i) the time period (set in step S301) between the train arrival time (found in step S302) and the pickup time to (ii) the train arrival time. Next, the pickup request creating section 64 finds a time required for the user 162 to go from the departure place of the user 162 (found in step S304) to the arrival station. Then, the pickup request creating section 64 estimates the time at which the user 162 (user A) should leave for the pickup place, by subtracting the time required from the train arrival time.

Then, the pickup request creating section 64 creates image data including (i) the above-created position data of the arrival station and (ii) a URL for obtaining a map of the area around the position indicated by the position data or facilities information in this area.

Lastly, in step S306, the pickup request sending section 65 sends, to the communication device 80 via the communication section 61, (i) the image data created by the pickup request creating section 64 and (ii) the above-created information on the departure station, the train departure time, the arrival station, the train arrival time, the departure place of the user 162 (user A), and the time (found in step S305) at which the user 162 (user A) should leave for the pickup place. This finishes the processes.

Note here that, the image data sent to the communication device 80 has a file name including a name of the position indicated by the image data. That is, the file name includes the name of the arrival station, e.g., "Tsudayama.jpg". This makes it easier for a user of the communication device 80, or a user of the communication device 10 which receives the image data in step S105 of FIG. 2, to recognize the pickup place.

As described so far, the communication device 10 of the present embodiment includes: the wireless communication section 20 for carrying out data communication with the navigation device 50; and the line communication section 30 for carrying out data communication with the communication device 80, the communication device 10, further including: the address sending section 22 for sending, to the navigation device 50 via the wireless communication section 20, first identification information for identifying the communication device 80; the position receiving section 26 for receiving, from the communication device 80 via the line communication section 30, position information for specifying a position; the position sending section 24 for sending the position information to the navigation device 50 via the wireless communication section 20; the message receiving section 32 for receiving a message from the navigation device 50 via the wireless communication section 20; the address adding section 34 for adding, to the message, second identification information for identifying the communication device 10; and the message sending section 36 for sending, to the communication device 80 via the line communication section 30, the message to which the second identification information is added by the address adding section 34.

A communication method of the present embodiment is a communication method carried out by the communication device 10 including: the wireless communication section 20 for carrying out data communication with the navigation device 50; and the line communication section 30 for carrying out data communication with the communication device 80, the method, including the steps of: sending, to the navigation device 50 via the wireless communication section 20, first identification information for identifying the communication device 80; receiving, from the communication device 80 via the line communication section 30, position information for specifying a position; sending the position information to the navigation device 50 via the wireless communication section 20; receiving a message from the navigation device 50 via the wireless communication section 20; adding, to the message, second identification information for identifying the communication device 10; and sending, to the communication device 80 via the line communication section 30, the message to which the second identification information is added in the step of adding.

According to the configuration, the address sending section 22 sends, to the navigation device 50, the first identification information for identifying the communication device 80. Specifically, the address sending section 22 sends, to the navigation device 50, an email address stored in an address book of the communication device 10. This makes it possible to create, on the navigation device 50, a message directed to the email address stored in the address book.

Further, the position receiving section 26 receives, from the communication device 80, position data specifying the pickup place. Then, the position sending section 24 sends the position information to the navigation device 50. This enables the navigation device 50 to carry out determination on the basis of the position information specified by a user of the communication device 80.

Furthermore, the message receiving section 32 receives the message from the navigation device 50; the address adding section 34 adds, to the message, the second identification information of the communication device 10; and the message sending section 36 sends, to the communication device 80, the message to which the second identification information of the communication device 10 is added. This makes it possible to send a message to the communication device 80 in such a manner that the communication device 80 can identify the communication device 10 as the sender of the message.

As described so far, the communication device sends, to the information presentation device, the first identification information stored in the communication device. Then, the communication device adds, to the message, the second identification information of the communication device, and then sends the message. This makes it possible to present identification information of a sender in such a way that the identification information is easily recognized by a user.

The communication device 10 of the present embodiment is configured such that the position information received by the position receiving section 26 is image data in which the position information is embedded.

Since the position information is embedded in the image data according to the configuration, the position information is sent as the image data. This makes it possible to send the position information by making use of a configuration in which the image data is sent and received.

According to the communication device 10 of the present embodiment, the line communication section 30 is communication means for establishing communication via the mobile telephone network, and the wireless communication section 20 is communication means for establishing communication via the short-distance wireless communication such as Bluetooth.

According to this configuration, the communication device 10 communicates with the communication device 80 via the mobile telephone network, and communicates with the navigation device 50 via the short-distance wireless communication. Accordingly, appropriate communication is achieved at a speed and by a method depending on the device with which the communication device 10 communicates. Specifically, in a case where the another communication device is a mobile terminal or the like, a communication method hardly affected by the position of the recipient, such method as 3G, can be used as the mobile telephone network. In a case where the information presentation device is a navigation device or the like located near the communication device, a cost-free and high-speed communication method such as Bluetooth® can be used as the short-distance wireless communication.

Further, it is possible to achieve the navigation device 50 for communicating with the communication device 10, by the navigation device 50 including: the position/address receiving section 54 for receiving, via the wireless communication section 52, the first identification information for identifying the communication device 80; the display section 59 for presenting, in accordance with the first identification information, a message recipient in a selectable manner; the position/address receiving section 54 for receiving the position information from the communication device 10 via the wireless communication section 52; the route search section 56 for estimating, on the basis of the position information, an arrival time at which the navigation device 50 arrives at the position specified by the position information; the message reply section 58 for generating, on the basis of the arrival time estimated by the arrival time estimating route search section 56, a message to be sent to the message recipient selected via the display section 59; and message sending means for sending, to the communication device 10 via the wireless communication section 52, the message generated by the message replay section 58.

Figure 15:
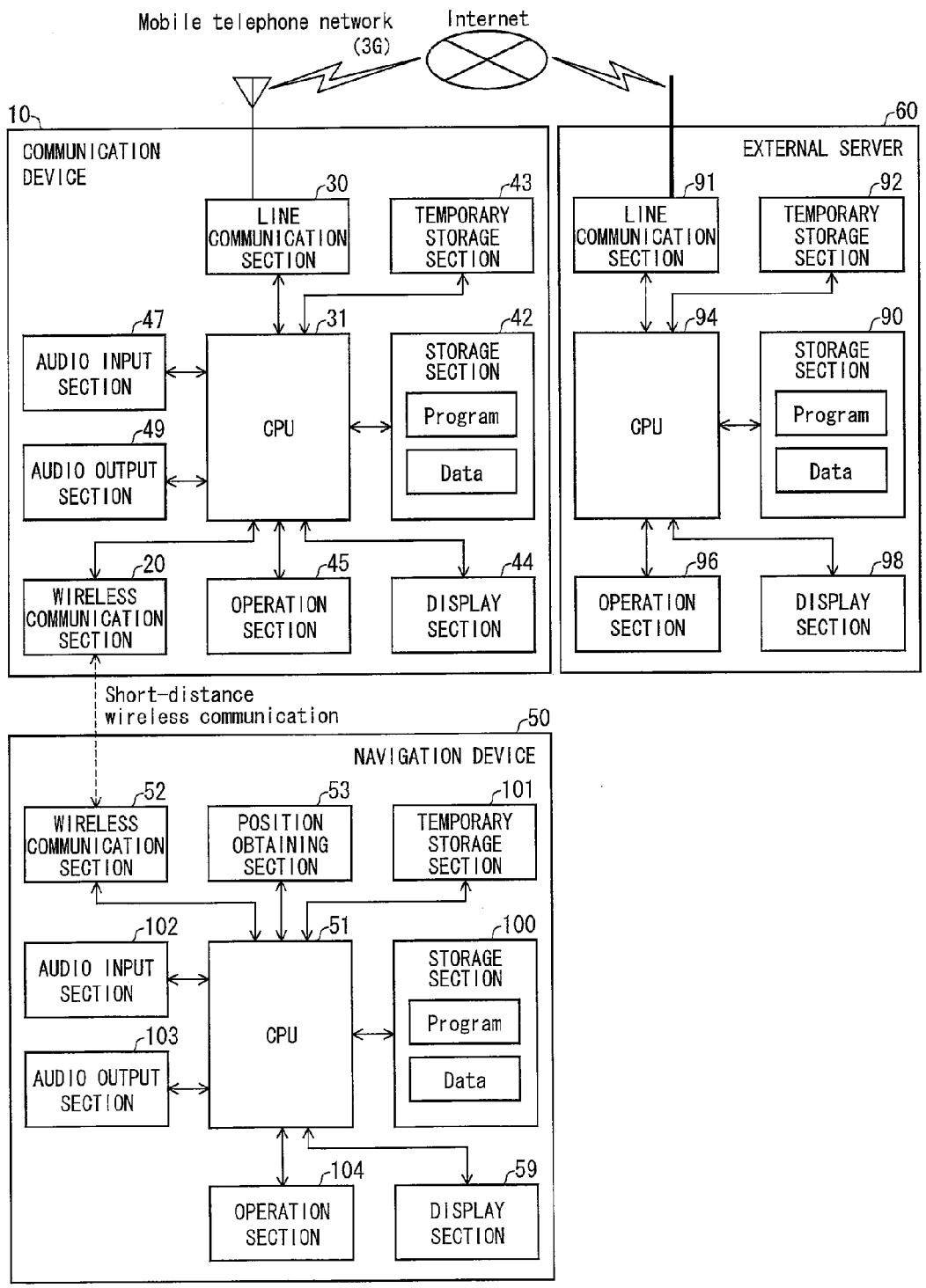
FIG. 15 is a view illustrating one example of a hardware configuration of each device constituting the communication system.

Note here that each of the communication device 10, the communication device 80, the external server 60, and the navigation device 50 can be realized by a hardware configuration illustrated in FIG. 15. FIG. 15 is a block diagram illustrating one example of the hardware configuration of each of the communication device 10, the communication device 80, the external server 60, and the navigation device 50. Note that, since the communication device 10 and the communication device 80 can be realized by an identical hardware configuration, FIG. 15 illustrates only the blocks of the communication device 10.

[Configuration of Communication Device 10]

The communication device 10 is a communication terminal having a call function and an email function, and is configured such that it can communicate with the navigation device 50 and with the external server 60. As illustrated in FIG. 15, the communication device 10 includes: a line communication section 30; an audio input section 47; an audio output section 49; a CPU 31; a temporary storage section 43; a storage section 42; a wireless communication section 20; an operation section 45; and a display section 44.

As described earlier, the line communication section 30 is for (i) establishing a telephone call with another mobile phone or with a fixed telephone, (ii) establishing communication via the Internet, and (iii) the like, via a mobile telephone network etc. According to the present invention, the line communication section 30 is used for communication between the communication device 10 and the external server 60. Specifically, the line communication section 30 connects with the Internet via a mobile telephone network (3G) so as to communicate with the external server 60 via the Internet.

The audio input section 47 is for inputting, for example during a phone call, an audio signal into the communication device 10. The audio output section 49 is for outputting, for example during a phone call, a sound corresponding to the audio signal etc. received by the line communication section 30. The audio output section 49 further outputs a ringtone for an incoming call or email etc. The audio input section 47 and the audio output section 49 are not limited to a particular kind as long as sound input and sound output respectively are available, and those used in a conventional mobile phone etc. can be used as the audio input section 47 and the audio output section 49.

The CPU 31 is for controlling the overall operations of the communication device 10, and operates by using, as a working area, the temporary storage section 43 which is constituted by for example a RAM. This realizes the functions of the service receiving section 46, the position receiving section 26, the service executing section 48, the address adding section 34, the message creating section 38, the message receiving section 32, the position sending section 24, the message sending section 36, and the address sending section 22, which are illustrated in FIG. 4

Specifically, as illustrated in FIG. 15, a program and data are stored in the storage section 42. The communication device 10 carries out predetermined operations, as described in the Embodiments, in such a manner that the CPU 31 (i) retrieves the program from the storage section 42, (ii) loads the program to the temporary storage section 43, and (iii) executes the program. Further, for example (a) data such as an email received by the line communication section 30 and (b) data such as a telephone number and an email address recorded by a user of the communication device 10 are also to be stored in the storage section 42. The storage section 42 can be removable from a main body of the communication device 10.

The wireless communication section 20 is for communication between the communication device 10 and another device. According to the present invention, the wireless communication section 20 is used for communication between the communication device 10 and the navigation device 50. In the present embodiment, the user having the communication device 10 is in a vehicle in which the navigation device 50 is installed, and a communication device 10 communicates with the navigation device 50.

In view of this, the wireless communication section 20 is not particularly limited as long as it allows for communication between the communication device 10 belonging to the user and the navigation device 50. Further, how the wireless communication section 20 communicates is not particularly limited.

For example, as described in the Embodiments, the wireless communication section 20 can employ Bluetooth communication, ZigBee®, UWB (Ultra Wide Band), or IEEE 802.11 wireless such as Wi-Fi®. Further, a connection between the communication device 10 and the navigation device 50 is not particularly limited as long as the communication between the communication device 10 and the navigation device 50 is available, and therefore can be a wireless connection.

The operation section 45 is a section via which the user of the communication device 10 carries out input operations, and is not limited to a particular kind as long as it enables the user to carry out intended input operations. The present embodiment is based on the assumption that the operation section 45 is constituted by operation keys provided on a surface of a main body of the communication device 10.

Specifically, the operation keys are: various menu keys for causing the display section 44 to display menu screens regarding emails and Internet connection etc.; keys for starting or finishing a telephone call etc.; arrow keys of up, down, right, and left for selecting an item displayed on the display section 44; an OK key for determining the selection of the item; character input keys for inputting numbers and texts; a switching key for switching between types of the characters to be input; and the like.

The display section 44 is a display output device for displaying an image in accordance with an instruction from the CPU 31. The display section 44 is not limited to a particular kind as long as it displays the image in accordance with the instruction from the CPU 31. For example, the display section 44 can be constituted by an LCD (Liquid Crystal Display) panel, an EL (Electro Luminescence) display panel, or the like.

The communication device 80 further includes a current position obtaining section, so as to obtain a current position of the communication device 80 and then send it to the communication device 10. The current position obtaining section is for obtaining the current position of the communication device 80. The current position obtaining section is not particularly limited as long as it can detect the current position of the communication device 80, and can be for example (i) a section which obtains the current position with use of GPS or (ii) a section which detects the current position by determining which base station is currently available to the communication device 80.

[Configuration of Navigation Device 50]

As illustrated in FIG. 15, the navigation device 50 includes: a wireless communication section 52; a position obtaining section 53; an audio input section 102; an audio output section 103; a CPU 51; a temporary storage section 101; a storage section 100; an operation section 104; and a display section 59.

The wireless communication section 52 is for communicating with the wireless communication section 20 of the communication device 10. To this end, the wireless communication section 52 is configured so as to be able to establish communication by a communication method identical to that of the wireless communication section 20 of the communication device 10. Since the present embodiment is based on the assumption that the wireless communication section 20 of the communication device 10 establishes communication via Bluetooth, the wireless communication section 52 of the navigation device 50 is configured to support the Bluetooth communication.

The position obtaining section 53 obtains, with use of GPS, the current position of the navigation device 50 (i.e., a current position of the vehicle in which the navigation device 50 is installed). According to the navigation device 50, a map of an area around the current position is displayed on the display section 59 on the basis of the current position. Further, the current position of the vehicle is displayed on the map.

The audio input section 102 is for inputting a sound into the navigation device 50, and is constituted by for example a microphone. The navigation device 50 is configured such that an input operation can be carried out (i) via the operation section 104 and (ii) by inputting a sound via the audio input section 102.

The audio output section 103 is for outputting a sound in accordance with an instruction from the CPU 51, and is constituted by for example a speaker. For example, a sound of a route guidance etc. is outputted from the audio output section 57.

The CPU 51 is for controlling the overall operations of the navigation device 50, and operates by using, as a working area, the temporary storage section 101 which is constituted by for example a RAM. This realizes the functions of the position/address receiving section 54, the route search section 56, and the message reply section 58, which are illustrated in FIG. 3.

Specifically, as illustrated in FIG. 15, a program and data are stored in the storage section 100. The navigation device 50 carries out predetermined operations, as described in the Embodiments, in such a manner that the CPU 51 (i) retrieves the program from the storage section 100, (ii) loads the program to the temporary storage section 101, and (iii) executes the program. Further, for example map data and audio data for outputting a sound etc. are stored in the storage section 100. The storage section 100 can be removable from a main body of the navigation device 500.

The operation section 104 is a section via which a user carries out an input operation to the navigation device 50. The display section 59 is for displaying, in accordance with the instruction from the CPU 51, (i) an input screen for inputting a destination, (ii) a map, (iii) a route to a destination, and (iv) the like. According to the navigation device 50, the operation section 104 is constituted by a so-called touch panel. That is, the navigation device 50 receives input operations when the operation section 104 detects that the display section 59 is touched. The operation section 104 is not particularly limited as long as it can receive user's input operations. For example, the operation section 104 can include a plurality of input buttons.

[Configuration of External Server 60]

As illustrated in FIG. 15, the external server 60 includes: a line communication section 91; a CPU 94; a temporary storage section 92; a storage section 90; an operation section 96; and a display section 98.

The line communication section 91 is for communicating with the line communication section 30 of the communication device 10. To this end, the line communication section 91 is configured so as to be able to establish communication by a communication method identical to that of the line communication section 30 of the communication device 10. Since the present embodiment is based on the assumption that the line communication section 30 of the communication device 10 establishes communication via the Internet, the communication section 61 of the external server 60 is configured to support internet communication. The communication via the line communication section 91 is controlled by the communication section 61 (refer to FIG. 5).

The CPU 94 is for controlling the overall operations of the external server 60, and operates by using, as a working area, the temporary storage section 92 which is constituted by for example a RAM. This realizes the functions of the position confirmation sending section 66, a route sending section 68, the route search section 63, the pickup request creating section 64, the pickup request sending section 65, a terminal specifying section 67, and the position sending section 62, which are illustrated in FIG. 5.

Specifically, as illustrated in FIG. 15, a program and data are stored in the storage section 90. The external server 60 carries out predetermined operations, as described in the Embodiments, in such a manner that the CPU 94 (i) retrieves the program from the storage section 90, (ii) loads the program to the temporary storage section 92, and (iii) executes the program.

As illustrated in FIG. 15, a program and data are stored in the storage section 90. The external server 60 carries out predetermined operations, as described in the Embodiments, in such a manner that the CPU 94 (i) retrieves the program from the storage section 90, (ii) loads the program to the temporary storage section 92, and (iii) executes the program. Note here that, although not illustrated in FIG. 15, the storage section 90 includes the timetable storage section 70, the place name-position storage section 72, the departure place storage section 74, and the map-position storage section 76, which are illustrated in FIG. 5.

The operation section 96 is a section via which a user carries out an input operation to the external server 60. The display section 98 is for displaying an image in accordance with an instruction from the CPU 94. This enables a user to carry out the input operation to the external server 60 while viewing the image displayed on the display section 98.

The invention is not limited to the description of the embodiments above, but may be altered within the scope of the claims. An embodiment based on a proper combination of technical means altered within the scope of the claims is encompassed in the technical scope of the invention.

As described so far, the various blocks in the communication device 10, the navigation device 50, and the communication device 80, especially the position sending section 24, the address adding section 34, the position/address receiving section 54, the position obtaining section 81, the position sending section 82, and the like can be implemented by software executed by a CPU as follows.

Namely, each of the communication device 10, the navigation device 50, and the communication device 80 includes a CPU (central processing unit) and memory devices (storage media). The CPU executes instructions contained in control programs so as to realize various functions. The memory devices may be a ROM (read-only memory) containing programs, a RAM (random access memory) to which the programs are loaded, or a memory containing the programs and various data. An object of the present invention can be achieved also by mounting, to the communication device 10, the navigation device 50, and the communication device 80, a computer-readable storage medium containing control program code (executable programs, intermediate code programs, or source programs) for control programs for the communication device 10, the navigation device 50, and the communication device 80, which control programs are software implementing the aforementioned functions, in order for a computer (or CPU, MPU) of each of the communication device 10, the navigation device 50, and the communication device 80 to retrieve and execute the program code contained in the storage medium.

The storage medium can be, for example, a tape, such as a magnetic tape or a cassette tape; a magnetic disk, such as a Floppy® disk or a hard disk, or an optical disc, such as a CD-ROM/MO/MD/DVD/CD-R; a card, such as an IC card (memory card) or an optical card; or a semiconductor memory, such as a mask ROM/EPROM/EEPROM/flash ROM.

Each of the communication device 10, the navigation device 50, and the communication device 80 can be arranged to be connectable to a communications network so that the program code is delivered over the communications network. The communications network is not limited in any particular manner, and can be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and can be, for example, a wired line, such as IEEE 1394, USB, an electric power line, a cable TV line, a telephone line, or an ADSL; or wireless, such as infrared (IrDA, remote control), Bluetooth®, 802.11 wireless, HDR, a mobile telephone network, a satellite line, or a terrestrial digital network. The present invention encompasses a carrier wave, or data signal transmission, in which the program code is embodied electronically.

Needless to say that each of the communication device 10, navigation device 50, and the communication device 80 can be implemented by hardware.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A communication device in accordance with the present invention is capable of (i) sending, to a information presentation device, first identification information for identifying another communication device, (ii) receiving, from the another communication device, position information for specifying a certain position, (iii) sending the position information to the information presentation device, (iv) receiving a message from the information presentation device, (v) adding, to the message, second identification information for identifying the communication device, and (iv) sending, to the another communication device, the message to which the second identification information is added. This makes it possible to present identification information of a sender in such a way that the identification information is easily understood by a user. Accordingly, the present invention is applicable to electronic devices such as a communication device, a navigation device, a mobile phone, a PDA (Personal digital Assistant), a gaming device, and an information presentation device.

Reference Signs List

| | |
|---|---|
| 10 | Communication device |
| 20 | Wireless communication section (Second communication means) |
| 22 | Address sending section (Identification information sending means) |
| 24 | Position sending section (Position information sending means) |
| 26 | Position receiving section (Position information receiving means) |
| 30 | Line communication section (First communication means) |
| 32 | Message receiving section (Message receiving means) |
| 34 | Address adding section (Identification information adding means) |
| 36 | Message sending section (Message sending means) |
| 38 | Message creating section |
| 40 | Input section |
| 42 | Storage section |
| 44 | Display section |
| 46 | Service receiving section |
| 48 | Service executing section |
| 50 | Navigation device (Information presentation device) |
| 52 | Wireless communication section |
| 54 | Position/address receiving section (Identification information receiving means, Position information receiving means) |
| 55 | Position storage section |
| 56 | Route search section (Arrival time estimating means) |
| 58 | Message reply section (Message generating means, message sending means) |
| 59 | Display section (Recipient presenting means) |
| 60 | External server |
| 61 | Communication section |
| 62 | Position sending section |
| 63 | Route search section |
| 64 | Pickup request creating section |
| 65 | Pickup request sending section |
| 66 | Position confirmation sending section |
| 70 | Timetable storage section |
| 72 | Place name-position storage section |
| 74 | Departure place storage section |
| 76 | Map-position storage section |
| 80 | Communication device |
| 81 | Position obtaining section |
| 82 | Position sending section |
| 84 | Message receiving section |
| 85 | Line communication section |
| 86 | Address receiving section |

The invention claimed is:

1. A communication device, comprising:
a first communication section for carrying out data communication with an information presentation device; and
a second communication section for carrying out data communication with another communication device,
said communication device, further comprising:
an identification information sending section for sending, to the information presentation device via the first communication section, first identification information for identifying the another communication device;
a position information receiving section for receiving, from the another communication device via the second communication section, position information for specifying a position;
a position information sending section for sending the position information to the information presentation device via the first communication section;
a message receiving section for receiving a message from the information presentation device via the first communication section;
an identification information adding section for adding, to the message, second identification information for identifying the communication device; and
a message sending section for sending, to the another communication device via the second communication section, the message to which the second identification information is added by the identification information adding section.

2. The communication device according to claim 1, wherein the position information received by the position information receiving section is image data in which the position information is embedded.

3. The communication device according to claim 1, wherein:
the first communication section is communication section for establishing communication via a short-distance wireless communication; and
the second communication section is communication section for establishing communication via a mobile telephone network.

4. An information presentation device for communicating with a communication device recited in claim 1 via the first communication section, comprising:
an identification information receiving section for receiving, via the first communication section, the first identification information for identifying the another communication device;
a recipient selecting section for presenting, in accordance with the first identification information, a message recipient in a selectable manner;
a position information receiving section for receiving the position information from the communication device via the first communication means;
an arrival time estimating section for estimating, on the basis of the position information, an arrival time at which the information presentation device arrives at the position specified by the position information;
a message generating section for generating, on the basis of the arrival time estimated by the arrival time estimating section, a message to be sent to the message recipient selected via the recipient selecting section; and
a message sending section for sending, to the communication device via the first communication section, the message generated by the message generating section.

5. A communication method carried out by a communication device including:
a first communication section for carrying out data communication with an information presentation device; and
a second communication section for carrying out data communication with another communication device,
said method, comprising the steps of:
sending, to the information presentation device via the first communication section, first identification information for identifying the another communication device;
receiving, from the another communication device via the second communication section, position information for specifying a position;
sending the position information to the information presentation device via the first communication section;
receiving a message from the information presentation device via the first communication section;
adding, to the message, second identification information for identifying the communication device; and
sending, to the another communication device via the second communication section, the message to which the second identification information is added in the step of adding.

6. A non-transitory computer-readable recording medium in which a program for causing a communication device recited in claim 1 to operate is stored, said program being for causing a computer to function as each of the section recited in claim 1.

7. A non-transitory computer-readable recording medium in which a program for causing an information presentation device recited in claim 4 to operate is stored, said program being for causing a computer to function as each of the section recited in claim 4.

* * * * *